(12) United States Patent
Pannell et al.

(10) Patent No.: US 7,774,178 B2
(45) Date of Patent: Aug. 10, 2010

(54) METHODS FOR ON-LINE DETERMINATION OF DEGREE OF RESIN STICKINESS USING A MODEL FOR DEPRESSION OF MELT INITIATION TEMPERATURE

(75) Inventors: Richard B. Pannell, Kingwood, TX (US); Robert O. Hagerty, La Porte, TX (US); Eric J. Markel, Kingwood, TX (US)

(73) Assignee: Univation Technologies, LLC, Houston, TX (US)

( * ) Notice: Subject to any disclaimer, the term of this patent is extended or adjusted under 35 U.S.C. 154(b) by 413 days.

(21) Appl. No.: 11/827,684

(22) Filed: Jul. 13, 2007

(65) Prior Publication Data

US 2008/0065360 A1 Mar. 13, 2008

Related U.S. Application Data

(60) Provisional application No. 60/842,719, filed on Sep. 7, 2006.

(51) Int. Cl.
*G06F 17/10* (2006.01)

(52) U.S. Cl. ............................................. 703/2; 526/59

(58) Field of Classification Search ..................... 703/2; 526/59–61, 68, 348.5
See application file for complete search history.

(56) References Cited

U.S. PATENT DOCUMENTS

| 3,056,771 | A | 10/1962 | Lee et al. ..................... 526/159 |
|---|---|---|---|
| 3,082,198 | A | 3/1963 | Klein ........................... 526/91 |
| 3,470,143 | A | 9/1969 | Schrage et al. ............... 526/206 |
| 3,919,185 | A | 11/1975 | Takebe et al. ................. 526/74 |
| 4,012,574 | A | 3/1977 | Jones et al. ................... 526/74 |
| 4,194,073 | A | 3/1980 | McDaniel ..................... 526/98 |
| 4,232,140 | A | 11/1980 | Ort .............................. 526/129 |
| 4,302,566 | A | 11/1981 | Karol et al. |
| 4,405,495 | A | 9/1983 | Lee et al. ..................... 502/104 |
| 4,543,399 | A * | 9/1985 | Jenkins et al. ................ 526/70 |
| 4,588,790 | A * | 5/1986 | Jenkins et al. ................ 526/70 |

(Continued)

FOREIGN PATENT DOCUMENTS

EP 0089691 9/1983

(Continued)

OTHER PUBLICATIONS

Usami, Takao et al., "Generation Mechanism of Short-Chain Branching Distribution in Linear Low-Density Polyethylenes" Macromolecules, vol. 19, pgs. 2722-2726 (1986).

(Continued)

*Primary Examiner*—Russell Frejd

(57) ABSTRACT

In some embodiments, a method including the steps of: during a polymerization reaction producing a polymer resin in a fluid bed reactor, measuring reaction parameters including at least reactor temperature, at least one property of the resin, and amount of at least one condensable diluent gas in the reactor; determining from at least one measured resin property using a predetermined correlation, a dry melt initiation temperature value for a dry version of the polymer resin; and during the reaction, using a melt initiation temperature depression model to determine in on-line fashion a reduced melt initiation temperature for the resin (e.g., a temperature at which the resin is expected to begin to melt) in the presence of the at least one condensable diluent gas in the reactor.

59 Claims, 4 Drawing Sheets

Process For Monitoring And Control of Reactor Stickiness

U.S. PATENT DOCUMENTS

| | | | | |
|---|---|---|---|---|
| 4,593,010 | A | 6/1986 | Malpass | 502/115 |
| 4,704,491 | A | 11/1987 | Tsutsui | 585/10 |
| 4,792,592 | A | 12/1988 | Fulks et al. | 526/62 |
| 4,803,251 | A | 2/1989 | Goode et al. | 526/59 |
| 4,855,370 | A | 8/1989 | Chirillo et al. | 526/74 |
| 5,026,795 | A | 6/1991 | Hogan | |
| 5,037,905 | A | 8/1991 | Cummings et al. | 526/74 |
| 5,066,736 | A | 11/1991 | Dumain et al. | 526/82 |
| 5,084,534 | A | 1/1992 | Welborn et al. | 526/160 |
| 5,086,134 | A | 2/1992 | Antberg | 526/126 |
| 5,194,526 | A | 3/1993 | Hussein et al. | 526/74 |
| 5,218,071 | A | 6/1993 | Tsutsui et al. | 526/348 |
| 5,258,475 | A | 11/1993 | Kissin | 526/129 |
| 5,281,679 | A | 1/1994 | Jejelowo et al. | 526/114 |
| 5,290,745 | A | 3/1994 | Jorgensen et al. | 502/109 |
| 5,324,800 | A | 6/1994 | Welborn et al. | 526/160 |
| 5,342,907 | A | 8/1994 | Cann et al. | 526/129 |
| 5,352,749 | A * | 10/1994 | DeChellis et al. | 526/68 |
| 5,376,439 | A | 12/1994 | Hodgson et al. | 428/220 |
| 5,387,660 | A | 2/1995 | Doyle et al. | 526/69 |
| 5,391,657 | A | 2/1995 | Song et al. | 526/74 |
| 5,405,922 | A * | 4/1995 | DeChellis et al. | 526/68 |
| 5,410,002 | A | 4/1995 | Govoni et al. | 526/88 |
| 5,436,304 | A * | 7/1995 | Griffin et al. | 526/68 |
| 5,453,471 | A | 9/1995 | Bernier et al. | 526/68 |
| 5,462,999 | A | 10/1995 | Griffin et al. | 526/68 |
| 5,510,433 | A | 4/1996 | Baker et al. | 526/74 |
| 5,523,435 | A | 6/1996 | Lisowsky | 556/11 |
| 5,525,689 | A | 6/1996 | Tsutsui et al. | 526/160 |
| 5,541,272 | A | 7/1996 | Schmid et al. | 526/160 |
| 5,550,094 | A | 8/1996 | Ali et al. | 502/115 |
| 5,616,661 | A | 4/1997 | Eisinger et al. | 526/88 |
| 5,624,878 | A | 4/1997 | Devore et al. | 502/152 |
| 5,674,795 | A | 10/1997 | Wasserman et al. | 502/9 |
| 5,767,208 | A | 6/1998 | Turner et al. | 526/160 |
| 5,990,251 | A | 11/1999 | Gelus | |
| 6,124,229 | A | 9/2000 | Becker et al. | 502/102 |
| 6,147,172 | A | 11/2000 | Brown et al. | 526/126 |
| 6,234,950 | B1 | 5/2001 | Von Haken et al. | 502/155 |
| 6,235,671 | B1 | 5/2001 | McKay et al. | 502/110 |
| 6,235,672 | B1 | 5/2001 | McKay et al. | 502/155 |
| 6,239,061 | B1 | 5/2001 | Wang et al. | 502/162 |
| 6,239,238 | B1 | 5/2001 | Brown et al. | 526/161 |
| 6,248,845 | B1 | 6/2001 | Loveday et al. | 526/113 |
| 6,281,306 | B1 | 8/2001 | Oskam et al. | 526/161 |
| 6,313,236 | B1 | 11/2001 | Ford et al. | 526/74 |
| 6,355,744 | B1 | 3/2002 | Von Haken et al. | 526/127 |
| 6,417,298 | B1 | 7/2002 | Ford et al. | 526/89 |
| 6,455,638 | B2 | 9/2002 | Laughner et al. | 525/191 |
| 6,486,273 | B1 | 11/2002 | McKay et al. | 526/113 |
| 6,534,613 | B2 | 3/2003 | Ford et al. | 526/352 |
| 6,579,998 | B2 | 6/2003 | Sita et al. | 556/53 |
| 6,649,558 | B2 | 11/2003 | Brown et al. | 502/155 |
| 6,656,866 | B2 | 12/2003 | Wenzel et al. | 502/117 |
| 6,656,868 | B2 | 12/2003 | Oskam et al. | 502/155 |
| 6,660,815 | B2 | 12/2003 | Agapiou et al. | 526/130 |
| 7,122,607 | B2 | 10/2006 | Hagerty et al. | 526/73 |
| 7,300,987 | B2 * | 11/2007 | Hagerty et al. | 526/73 |
| 7,459,510 | B2 | 12/2008 | Lin et al. | 526/135 |
| 7,507,780 | B2 | 3/2009 | Hagerty et al. | 526/73 |
| 2001/0044505 | A1 | 11/2001 | Ford et al. | 526/62 |
| 2002/0198335 | A1 | 12/2002 | Bernier et al. | 526/88 |
| 2003/0100688 | A1 | 5/2003 | Farrer et al. | 526/110 |
| 2003/0121330 | A1 | 7/2003 | Muhle et al. | 73/600 |
| 2003/0171512 | A1 | 9/2003 | Mawson et al. | 526/129 |
| 2004/0063871 | A1 | 4/2004 | Parrish et al. | 526/61 |
| 2005/0267269 | A1 * | 12/2005 | Hagerty et al. | 526/68 |
| 2007/0043174 | A1 | 2/2007 | Parrish et al. | 526/59 |
| 2007/0060721 | A1 | 3/2007 | Muhle et al. | 526/49 |
| 2007/0073010 | A1 * | 3/2007 | Pannell et al. | 526/73 |
| 2009/0234081 | A1 | 9/2009 | Thomas et al. | 526/60 |

FOREIGN PATENT DOCUMENTS

| | | |
|---|---|---|
| EP | 0284707 | 10/1988 |
| EP | 0366823 | 5/1990 |
| EP | 0413326 | 2/1991 |
| EP | 0443686 | 8/1991 |
| EP | 0453116 | 10/1991 |
| EP | 0481480 | 4/1992 |
| EP | 0495099 | 7/1992 |
| EP | 0549252 | 6/1993 |
| EP | 0596553 | 5/1994 |
| EP | 0612768 | 8/1994 |
| EP | 0668296 | 8/1995 |
| EP | 0669346 | 8/1995 |
| EP | 0722955 | 7/1996 |
| EP | 0754708 | 1/1997 |
| EP | 0773239 | 5/1997 |
| EP | 0781789 | 7/1997 |
| EP | 0794200 | 9/1997 |
| EP | 1323746 | 7/2003 |
| JP | 09-176400 | 7/1997 |
| WO | WO 94/03509 | 2/1994 |
| WO | WO 97/14721 | 4/1997 |
| WO | WO 97/22635 | 6/1997 |
| WO | WO 98/02470 | 1/1998 |
| WO | WO 99/61486 | 12/1999 |
| WO | WO 02/46250 | 6/2002 |
| WO | WO 03/010211 | 2/2003 |
| WO | 03/051929 | 6/2003 |
| WO | WO 2004/058825 | 7/2004 |
| WO | WO 2004/058827 | 7/2004 |
| WO | WO 2004/058828 | 7/2004 |
| WO | 2005/049663 | 6/2005 |
| WO | 2005/113610 | 12/2005 |
| WO | 2005/113615 | 12/2005 |
| WO | 2006/009980 | 1/2006 |
| WO | WO 2008/030313 | 3/2008 |

OTHER PUBLICATIONS

Heiland, Kirstin and Kaminsky, Walter "Comparison of zirconocene and hafnocene catalysts for the polymerization of ethylene and 1-butene" Makromol. Chem., vol. 193, pp. 601-610 (1992).

Tian, Jun and Huang, Baotong, "Ethylene polymerization with catalyst systems based on metallocenes with varying steric hindrance and methylaluminoxane" Macromol. Rapid Commun., 15, 923-928 (1994).

Ardell et al., *Process Control: Optimization, Simulation: Model Prediction for Reactor Control*, CEP, (Jun. 1983), pp. 77-83.

*Agglomeration Detection by Acoustic Emission, Process Analysis & Automation*, (2000).

*Acoustic Emission Technology a New Sensing Technique for Optimising Polyolefin Production, Process Analysis & Automation*, (2000), pp. 2-12.

* cited by examiner

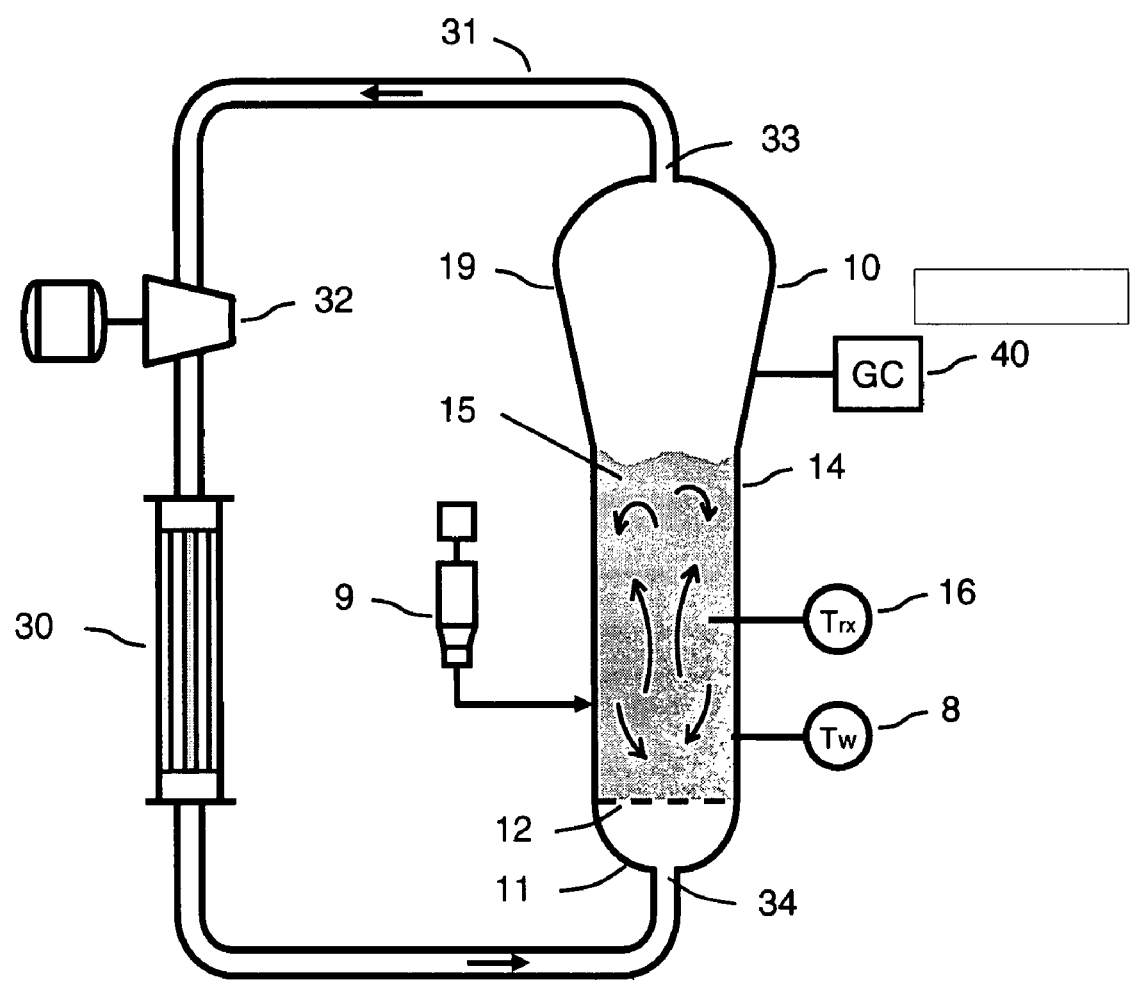
Figure 1 – Fluidized Bed Reaction System

Figure 2 – Process For Monitoring And Control of Reactor Stickiness
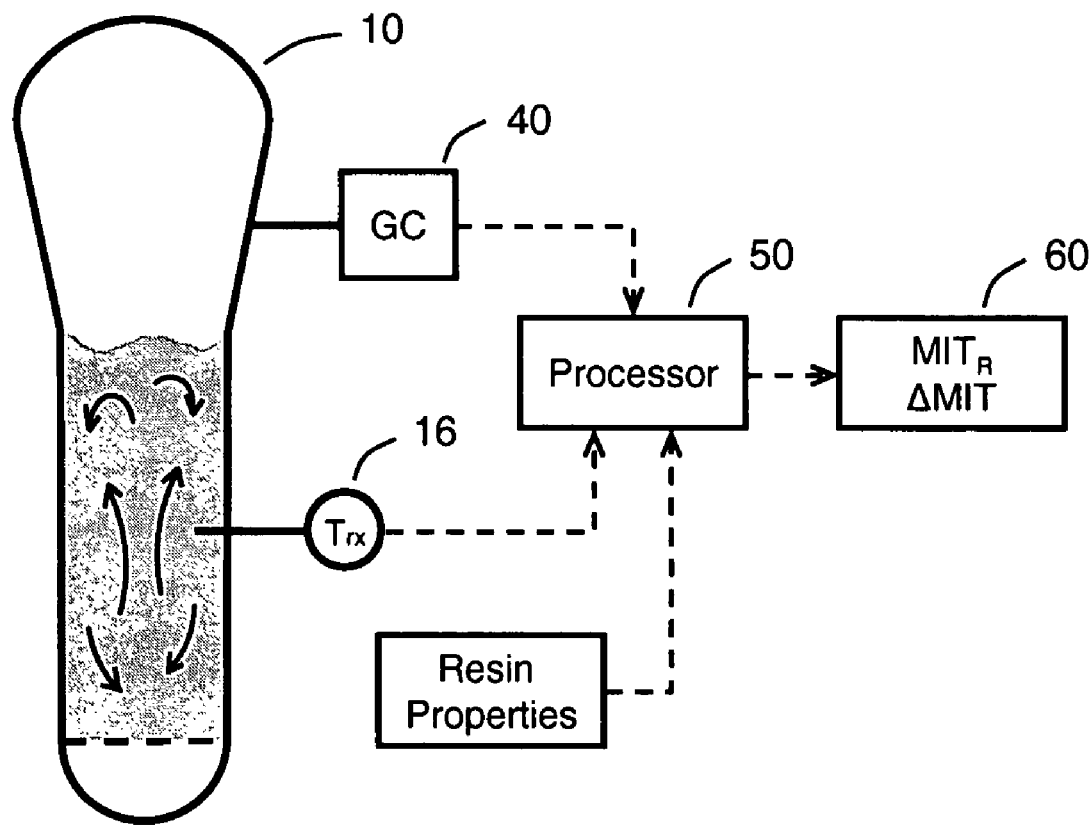

Figure 3 – First Melt DSC Curve
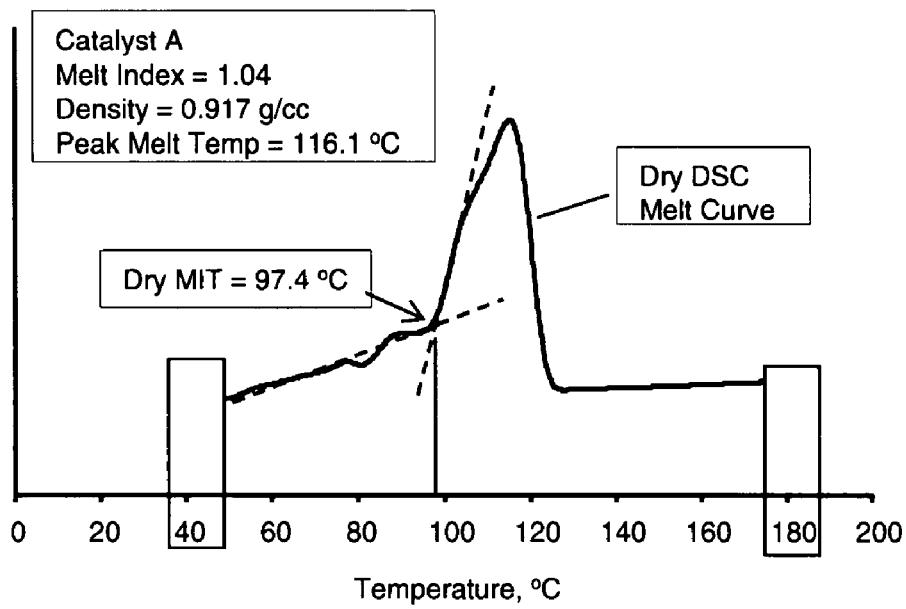
Figure 4 – Displaced MIT (MIT$_R$)
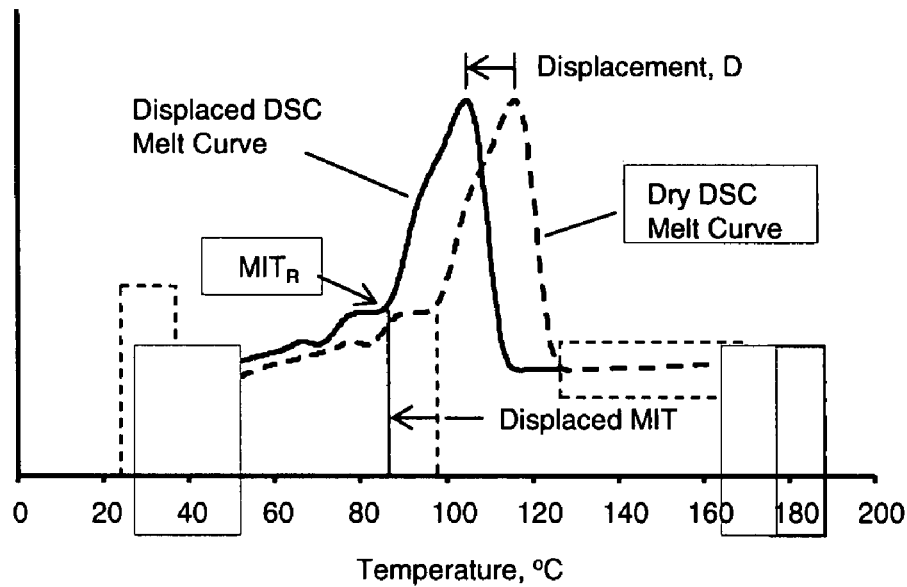

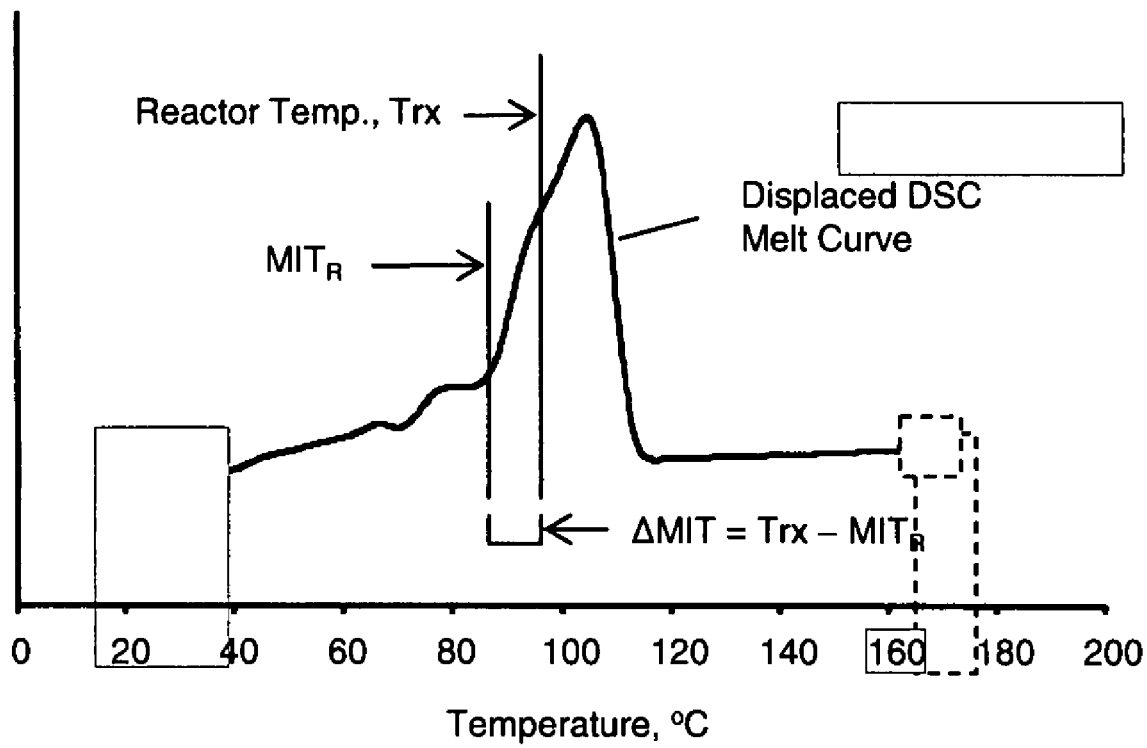
Figure 5 - ΔMIT

US 7,774,178 B2

METHODS FOR ON-LINE DETERMINATION OF DEGREE OF RESIN STICKINESS USING A MODEL FOR DEPRESSION OF MELT INITIATION TEMPERATURE

CROSS REFERENCE TO RELATED APPLICATIONS

This application claims the benefit of Ser. No. 60/842,719, filed Sep. 7, 2006, the disclosure of which is incorporated by reference.

FIELD OF THE INVENTION

The invention pertains to methods for monitoring a polymerization reaction (e.g., an olefin polymerization reaction conducted in a gas phase reactor) and determining a melt initiation temperature (indicative of the temperature at which polymer resin in the reactor is expected to begin to melt) from monitored reaction parameters in accordance with a predetermined model, and optionally also controlling the reaction in response to the melt initiation temperature. Embodiments of the invention relate to monitoring a gas-phase polymerization reaction in a fluid bed reactor and determining on an on-line basis a melt initiation temperature (indicative of the temperature at which polymer resin in the reactor is expected to begin to melt) from monitored reaction parameters in accordance with a predetermined melt initiation temperature depression model, and optionally also controlling the reaction in response to the melt initiation temperature.

BACKGROUND

The expression "on-line generation" of data during a reaction is used herein to denote generation of the data sufficiently rapidly that the data is available essentially instantaneously for use during the reaction. The expression "generation of data in on-line fashion" during a reaction is used synonymously with the expression on-line generation of data during a reaction. Generation of data from a laboratory test (on at least one substance employed or generated in the reaction) is not considered "on-line generation" of data during the reaction, if the laboratory test consumes so much time that parameters of the reaction may change significantly during the test. It is contemplated that on-line generation of data can include the use of a previously generated database that may have been generated in any of a variety of ways including time-consuming laboratory tests.

With reference to a product being produced by a continuous reaction, the expression "instantaneous" value of a property of the product herein denotes the value of the property of the most recently produced quantity of the product. The most recently produced quantity typically undergoes mixing with previously produced quantities of the product before a mixture of the recently and previously produced product exits the reactor. In contrast, with reference to a product being produced by a continuous reaction, "average" (or "bed average") value (at a time "T") of a property herein denotes the value of the property of the product that exits the reactor at time T.

Throughout this disclosure, the expression "diluent" (or "condensable diluent" or "condensable diluent gas") denotes condensable gas (or a mixture of condensable gases) present in a polymerization reactor with polymer resin being produced. The diluent is condensable at the temperatures encountered in the process heat exchanger. Examples of diluents include induced condensing agents (ICAs), comonomers, isomers of comonomers, and combinations thereof.

The expression "dry polymer resin" (or "dry version" of polymer resin) is used herein to denote polymer resin that does not contain substantial amounts of dissolved gas. An example of dry polymer resin is polymer that had been previously produced in a polymerization reactor and then purged to eliminate all (or substantially all) unreacted comonomers and ICAs that had been dissolved in the polymer at the time of production. As will be discussed herein, a dry version of polymer resin has significantly different melting behavior than would the same polymer resin if it were in the presence of a significant amount of condensable diluent gas and comonomer.

The expression polyethylene denotes a polymer of ethylene and optionally one or more $C_3$-$C_{10}$ α-olefins while the expression polyolefin denotes a polymer of one or more $C_2$-$C_{10}$ α-olefins.

Throughout this disclosure, the abbreviation "MI" (or $I_2$) denotes melt index, according to ASTM-D-1238-E238-E.

One commonly used method for producing polymers is gas phase polymerization. A conventional gas phase fluidized bed reactor, during operation to produce polyolefins by polymerization, contains a fluidized dense-phase bed including a mixture of reaction gas, polymer (resin) particles, catalyst, and (optionally) catalyst modifiers. Typically, any of several process control variables can be controlled to cause the reaction product to have desired characteristics.

Generally in a gas-phase fluidized bed process for producing polymers from monomers, a gaseous stream containing one or more monomers is continuously passed through a fluidized bed under reactive conditions in the presence of a catalyst. This gaseous stream is withdrawn from the fluidized bed and recycled back into the reactor. Simultaneously, polymer product is withdrawn from the reactor and new monomer is added to replace the polymerized monomer. The recycled gas stream is heated in the reactor by the heat of polymerization. This heat is removed in another part of the cycle by a cooling system external to the reactor.

It is important to remove heat generated by the reaction in order to maintain the temperature of the resin and gaseous stream inside the reactor at a temperature below the polymer melting point and/or catalyst deactivation temperature. Further, heat removal is important to prevent excessive stickiness of polymer particles that if left unchecked, may result in loss of fluidization or agglomeration of the sticky particles which may lead to formation of chunks or sheets of polymer that cannot be removed as product. Further, such chunks or sheets may fall onto the distributor plate causing impaired fluidization, and in many cases forcing a reactor shutdown. Prevention of such stickiness has been accomplished by controlling the temperature of the fluid bed to a temperature below the fusion or sintering temperature of the polymer particles. Above this fusion or sintering temperature, empirical evidence suggests that such fusion or sintering leads to agglomeration or stickiness, which in turn, if left unchecked, may lead to the above conditions.

It is understood that the amount of polymer produced in a fluidized bed polymerization process is directly related to the amount of heat that can be withdrawn from the fluidized bed reaction zone since the exothermic heat generated by the reaction is directly proportional to the rate of polymer production. In steady state operation of the reaction process, the rate of heat removal from the fluidized bed must equal the rate of rate of heat generation, such that the bed temperature remains constant. Conventionally, heat has been removed from the fluidized bed by cooling the gas recycle stream in a heat exchanger external to the reactor.

A requirement of a fluidized bed process is that the velocity of the gaseous recycle stream be sufficient to maintain the reaction zone in a fluidized state. In a conventional fluidized bed polymerization process, the amount of fluid circulated to remove the heat of polymerization is greater than the amount of fluid required for support of the fluidized bed and for adequate mixing of the solids in the fluidized bed. The excess velocity provides additional gas flow to (and through) the fluid bed for additional cooling capacity and more intensive mixing of the reactor bed. However, to prevent excessive entrainment of solids in a gaseous stream withdrawn from the fluidized bed, the velocity of the gaseous stream must be regulated.

For a time, it was thought that the temperature of the gaseous stream external to the reactor, otherwise known as the recycle stream temperature, could not be decreased below the dew point of the recycle stream without causing problems of polymer agglomeration or plugging of the reactor system. The dew point of the recycle stream is that temperature at which liquid condensate first begins to form in the gaseous recycle stream. The dew point can be calculated knowing the gas composition and is thermodynamically defined using an equation of state.

Contrary to this belief, as suggested by Jenkins, et al. in U.S. Pat. No. 4,543,399 and related U.S. Pat. No. 4,588,790, a recycle stream can be cooled to a temperature below the dew point in a fluidized bed polymerization process resulting in condensing a portion of the recycle gas stream. The resulting stream containing entrained liquid is then returned to the reactor without causing the aforementioned agglomeration and/or plugging phenomena (which had been expected prior to Jenkins). The process of purposefully condensing a portion of the recycle stream is known in the industry as "condensed mode" operation in a gas phase polymerization process.

The above-cited U.S. patents to Jenkins et al. suggest that when a recycle stream temperature is lowered to a point below its dew point in "condensed mode" operation, an increase in polymer production is possible, as compared to production in a non-condensing mode because of increased cooling capacity. Consequently, a substantial increase in space-time yield, the amount of polymer production in a given reactor volume, can be achieved by condensed mode operation with little or no change in product properties.

Cooling of the recycle stream to a temperature below the gas dew point temperature produces a two-phase gas/liquid mixture with solids contained in both of these phases. The liquid phase of this two-phase gas/liquid mixture in "condensed mode" operation remains entrained or suspended in the gas phase of the mixture. Vaporization of the liquid occurs only when heat is added or pressure is reduced. In the process described by Jenkins, et al., vaporization occurs when the two-phase mixture enters the fluidized bed, with the (warmer) resin providing the required heat of vaporization. The vaporization thus provides an additional means of extracting heat of reaction from the fluidized bed. The heat removal capacity is further enhanced in condensed mode operation by the lower gas temperatures of the gas stream entering the fluidized bed. Both of these factors increase the overall heat removal capability of the system and thereby enable higher space-time yields (higher reactor production rates per unit volume of the fluidized bed).

Jenkins, et al. illustrate the difficulty and complexity of such reactor control in general, and of trying to extend the stable operating zone to optimize the space time yield in a gas phase reactor, especially when operating in condensed mode.

The cooling capacity of recycle gas can be increased further while at a given reaction temperature and a given temperature of the cooling heat transfer medium. One option described is to add non-polymerizing, non-reactive materials to the reactor, which are condensable at the temperatures encountered in the process heat exchanger. Such non-reactive, condensable materials are collectively known as induced condensing agents (ICAs). Increasing concentrations of ICA in the reactor causes corresponding increases in the dew point temperature of the reactor gas, which promotes higher levels of condensing for higher (heat transfer limited) production rates from the reactor. Suitable ICA materials are selected based on their specific heat and boiling point properties. In particular, an ICA compound is selected such that a relatively high portion of the material is condensed at the cooling water temperatures available in polymer production plants, which are typically 20-40° C. ICA materials include hexane, isohexane, pentane, isopentane, butane, isobutane and other hydrocarbon compounds that are similarly non-reactive in the polymerization process.

U.S. Pat. No. 5,352,749, to DeChellis et al, teaches that there are limits to the concentrations of condensable gases, whether ICA materials, comonomers or combinations thereof, that can be tolerated in the reaction system. Above certain limiting concentrations, the condensable gases can cause a sudden loss of fluidization in the reactor, and a consequent loss in ability to control the temperature in the fluid bed. The above-cited U.S. Pat. No. 5,352,749, and U.S. Pat. Nos. 5,405,922 and 5,436,304, disclose upper limits of ICA in the reactor are discussed, depending on the type of polymer being produced. U.S. Pat. No. 5,352,749 discloses that a limiting concentration of ICA (isopentane) exists, beyond which the reactor contents suddenly lose fluidization. The authors characterized this limit by tracking the ratio of fluidized bulk density to settled bulk density. As the concentration of isopentane was increased, they found that the bulk density ratio steadily decreased. When the concentration of isopentane was sufficiently high, corresponding to a bulk density ratio of 0.59, they found that fluidization in the reactor was lost. They therefore determined that this ratio (0.59) was a point of no return, below which the reactor will cease functioning due to loss of fluidization.

Although not appreciated by the authors of U.S. Pat. No. 5,352,749, the sudden loss in fluidization at relatively high ICA concentrations was due to the formation of sticky polymer.

As described in PCT Application Publication Number WO 2005/113615(A2), attempts to operate polymerization reactors with excessive ICA concentrations cause polymer particles suspended in the fluid bed to become cohesive or "sticky," and in some cases cause the fluid bed to solidify in the form of a large chunk. This stickiness problem is characterized by undesirable changes in fluidization and mixing in the fluid bed, which if left unchecked, may develop into a reactor discontinuity event, such as sheeting in the straight sided reaction section, sheeting in the dome of such a reactor or chunking, any of which can lead to reactor shut-downs, which in large scale reactors are expensive. These solid masses (sheets or chunks) of polymer eventually become dislodged from the walls and fall into the reaction section and settle on the distributor plate, where they interfere with fluidization, block the product discharge port, and usually force a reactor shut-down for cleaning. The term "discontinuity event" is used to describe a disruption in the continuous operation of a polymerization reactor caused by sheeting, chunking or distributor plate fouling. The terms "sheeting and/or chunking" while used synonymously herein, may describe different manifestations of problems caused by excessive polymer stickiness in the fluid bed. In either manifestation (sheeting or chucking) the excessive polymer stickiness can lead directly to a reactor discontinuity event with the associated loss production.

Two articles by Process Analysis & Automation Limited (PAA), entitled "Agglomeration Detection by Acoustic Emission," PAA Application note: 2002/111 (© 2000) and "Acoustic Emission Technology—a New Sensing Technique for Optimising Polyolefin Production" (® 2000), suggest process control in fluidized bed production of polyolefins utilizing acoustic emission sensors located at various positions on the reactor and recycle piping. These publications purport to solve the problem of detecting large polymer agglomerates in a reactor, such as chunks or sheets, rather than detecting stickiness of the resin particles, and provide only one specific example, showing the detection of a chunk of approximately 1.5 meters in diameter within a commercial fluid bed reactor. There is no mention of the detection of polymer stickiness or cohesiveness. In effect, the PAA documents describe the detection of agglomerates after they have been formed in the reactor, rather than detection of resin stickiness that, if left unchecked, could lead to the formation of the agglomerates.

PCT Application Publication Number WO 03/051929 describes the use of mathematical chaos theory to detect the onset and presence of sheeting in a fluid bed reactor. Signals from a range of instruments, including acoustic emission sensors, differential pressure sensors, static sensors, and wall temperature sensors are filtered by certain specified methods to construct a "time-series" of data, which is then processed by methods of non-linear dynamics herein referred to as chaos theory and compared to data from a control reactor running without sheeting. The onset of sheeting is indicated by an increase in mean "cycle time" (relative to a baseline, control reactor), usually with a concurrent decrease in the "mean deviation" of the time-series. Alternatively, the onset of sheeting is indicated by a decrease in the mathematical "entropy" of the time-series data, as compared to a similar reactor running without sheeting. (The terms "time-series", "cycle time", "mean deviation", and "entropy" here refer to calculated parameters defined by chaos theory.) This reference does not disclose processing of sensor readings (without recourse to the complexities involved with chaos theory) to generate data indicative of conditions at which the resin in a reactor is predicted to become sticky, or any method allowing safe operation of a polymerization reactor near its limit of ultimate cooling capacity for maximum production rates.

Adding to the complexity of control of stickiness while using ICAs, different polymer products vary widely in their ability to tolerate ICA materials, some having a relatively high tolerance (expressed in partial pressure of the ICA in the reactor), e.g. 50 psia, while other polymers may tolerate as little as 5 psia. In these latter polymers, the heat transfer limited production rates under similar conditions are substantially lower. Polymers which possess a more uniform comonomer composition distribution are known to have a higher tolerance to the partial pressure of the ICA in the reactor. Typical metallocene catalysts are a good example of catalysts that may produce polymers having a more uniform comonomer composition. However, at some point even these metallocene produced polymers reach a limiting ICA concentration that induces stickiness. The limiting ICA concentration depends on several factors in addition to the polymer type, including reactor temperature, comonomer type and concentration. Further, with the effect of temperature, ICA level and comonomer levels all affecting on the onset of stickiness, determining the point at which sticking begins to occur has heretofore been difficult.

Even within the constraints of conventional, safe operation, control of such reactors is complex adding further to the difficulty and uncertainty of experimentation if one wishes to find new and improved operating conditions that might result in higher production rates. Large-scale gas phase plants are expensive and highly productive. Risks associated with experimentation in such plants are high because downtime is costly. Therefore it is difficult to explore design and operating boundaries experimentally in view of the costs and risks.

It would be desirable to provide a method of determining a stable operating condition for gas fluidized bed polymerization, especially if operating in condensed mode, to facilitate optimum design of the plant and the determination of desirable process conditions for optimum or maximum production rates in a given plant design.

It would also be desirable to have a mechanism in commercial gas-phase reactors to detect the onset of stickiness that is a better or earlier indicator of the onset of stickiness than are conventional techniques (e.g., monitoring the fluidized bulk density as described in U.S. Pat. No. 5,352,749). Such a mechanism would allow the operators to determine when conditions of limiting stickiness are being approached, and enable them to take corrective action before discontinuity events (such as sheeting and chunking) occur, while keeping the reactors at or near conditions of maximum ICA concentration, permitting higher production rates with substantially less risk.

PCT Application Publication Number WO 2005/113615 and corresponding U.S. Patent Application Publication No. 2005/0267269, published Dec. 1, 2005, describe determination in a laboratory of a critical temperature below which resin in a polymerization reactor cannot become sticky, and use of this predetermined critical temperature to control the reactor. These references define "dry sticking temperature" of a polymer to be produced in a fluidized bed reactor as the temperature at which agglomeration or fouling on any surface of the reactor vessel begins to occur with the reactor operating at normal pressure and gas velocity but in the presence of substantially pure nitrogen rather than the normal gas components, or the temperature at which there is at least a 50% drop in bandwidth of the bed DP reading, whichever is less (where "bed DP reading" denotes measured pressure difference between the bottom and top of the fluid bed). They define "melting point depression" as the temperature by which the melting point of the polymer in the reactor will be depressed by the presence of condensables (ICA and comonomer) to be used in the process. The references also describe a method including the steps of determining the dry sticking temperature of a polymer to be produced; determining the melting point depression for the reaction as a result of laboratory measurements (i.e., by tests performed in a laboratory on a sample of the polymer to be produced, immersed in a liquid or liquid mixture) rather than reaction parameter measurements generated by monitoring the reaction; and then operating the gas phase reactor process with a bed temperature below a "critical temperature" defined as the dry sticking temperature minus the melting point depression. The references teach that performing the reaction with the bed temperature below the critical temperature can eliminate stickiness in the resin due to high concentrations of condensables.

U.S. patent application Ser. No. 11/227,710, entitled "Method for Operating a Gas-Phase Reactor at or Near Maximum Production Rates While Controlling Polymer Stickiness," filed by Michael E. Muhle and Robert O. Hagerty on Sep. 14, 2005, discloses monitoring (during operation of a polymerization reactor) of resin stickiness by generating a time series of readings of acoustic emissions of the contents of the reactor using acoustic emission sensors. Acoustic emission measurements are generated during steady state operation of a reactor (producing the relevant polymer). Additional acoustic emission measurements (generated during operation of the reactor) are then processed to determine whether they deviate from acoustic emissions indicative of steady state reactor operation. Such deviation is treated as an indication of onset of excessive stickiness of polymer particles in the reactor. Corrective action can be taken (e.g., ICA and/or monomer levels and/or reactor temperature can be adjusted) when the acoustic emission measurements are determined to deviate from those of a steady state reactor. However, this application does not teach the generation of a reference temperature above which resin in a reactor is predicted to become sticky.

Other background references include U.S. Patent Application Publication Nos. 2004/063871, 2007/073010, WO 2005/049663, WO 2005/113610, WO 2006/009980, and "Model Prediction for Reactor Control," Ardell et al., Chemical Engineering Progress, American Inst. Of Chem. Eng., US, vol. 79, no. 6, (June 1983).

SUMMARY

In a class of embodiments, the invention provides a reaction control parameter to characterize the degree of polymer stickiness in a fluidized bed reactor; and a process, based on this parameter, to control the reactor to avoid conditions of excessive resin stickiness. The new parameter, defined herein as $\Delta$MIT, combines the effects of all variables that are known to affect resin stickiness into a single variable, which can be used as a quantitative basis for controlling process conditions in the reactor so as to avoid discontinuity problems associated with excessive resin stickiness. This process control parameter can also be used with a reactor control system to enable operation of a reactor system closer to its process limits for maximum production rates.

In some embodiments, the inventive method includes the steps of:

during a polymerization reaction in a fluid bed reactor which produces a polymer resin, measuring reaction parameters including at least reactor temperature, at least one resin property (e.g., density and melt index) of the polymer resin, and concentration (e.g., partial pressure) of at least one condensable diluent gas in the reactor (e.g., partial pressures of ICA, comonomer, and at least one isomer of the comonomer in the reactor);

determining from the at least one resin property, using a predetermined correlation, a dry melt initiation temperature ("dry MIT" or "MIT") value for a dry version of the polymer resin (i.e. a temperature at which the dry version of the resin is expected to begin to melt); and during the reaction, using a temperature depression model to determine in on-line fashion from at least one of the parameters measured in step (a) and the dry melt initiation temperature value determined in step (b), a reduced melt initiation temperature (denoted herein as "$MIT_R$") for the polymer resin in the presence of the at least one condensable diluent gas, said model identifying an estimated degree of depression of the dry MIT value of the polymer resin due to presence of at least one condensable diluent gas. Preferably, the MIT depression model implements the Flory equation. The reduced melt initiation temperature can be a temperature at which the polymer resin is expected to begin to melt in the presence of the at least one condensable gas in the reactor. The parameter $MIT_R$ is believed to characterize the temperature at which the resin in the reactor begins to melt (in the presence of condensable gases). Typically, $MIT_R$ is at least substantially equal to MIT−D, where MIT ("melt initiation temperature") is the dry MIT value determined in step (b), and D is an estimated degree of MIT depression due to the presence of the at least one condensable diluent gas with the resin in the reactor.

Steps (b) and (c) can be performed in any of a variety of ways, including by accessing one or more look-up tables prepared in accordance with the predetermined correlation or the model.

In some implementations, the dry MIT value is a temperature at which the polymer resin in the reactor is expected to begin to melt with the reactor operating at normal pressure and gas velocity but in the presence of substantially pure nitrogen rather than any significant amount of condensable diluent gas that is actually present in the reactor during the reaction.

Typically, the dry MIT value is determined in step (b) for the particular polymer in the reactor using a correlation of dry MIT values versus polymer properties (e.g., density, MI, etc.). The correlation is developed from dry MIT values that have been previously determined for the full range of polymers (of different density, MI, etc.) expected to be produced in the reactor. The polymer properties (density, MI, etc.) are provided as input to the correlation, and the dry MIT value is provided as the output.

Alternatively, the dry MIT value may be determined in step (b) for the particular polymer in the reactor using a database of dry MIT values. The database is populated with dry MIT values that have been previously determined for the full range of polymers expected to be produced in the reactor. The polymer properties (density, MI, etc.) are provided as input to the database, and the dry MIT value is provided as the output. The dry MIT values may be determined from DSC (differential scanning calorimetry) measurements as described below.

Preferably, steps (a)-(c) are performed repeatedly (e.g., on an ongoing basis) during the reaction to generate a sequence of values $MIT_R$. Calculated values of $MIT_R$ can be taken as an indication (or an estimate) of the temperature at which significant melting of the polymer in the fluidized bed would begin to occur, under current reaction conditions. The method preferably also includes the step of using the current value $MIT_R$ (calculated on-line using current reactor data) as a quantitative basis for control of the reaction (e.g., to maintain or attempt to maintain on-line $MIT_R$ values in the reactor in a predetermined relationship with a predetermined limiting value or range of values) to avoid conditions of excessive resin stickiness.

Typically, the three-step method described above also includes the step of:

(d) determining a temperature value indicative of resin stickiness in the reactor, from the reduced melt initiation temperature determined in step (c) and a current value of the reactor temperature.

Preferably, the three-step method described above also includes the step of:

(d) determining in on-line fashion a temperature value indicative of resin stickiness in the reactor, from the reduced melt initiation temperature determined in step (c) and a current value of the reactor temperature.

In some embodiments, the temperature value generated in step (d) is a temperature value $\Delta$MIT that is at least substantially equal to $Trx-MIT_R$, where Trx is the current reactor temperature, and $MIT_R$ is the reduced melt initiation temperature determined in step (c). In other embodiments, the temperature value generated in step (d) is a temperature value indicative of the degree of resin stickiness in the fluidized bed.

Preferably, steps (a)-(d) are performed repeatedly (e.g., on an ongoing basis) during the reaction to generate a sequence of temperature values indicative of resin stickiness in the reactor (e.g., a sequence of values of ΔMIT or data indicative of a time-varying value of ΔMIT), and the method also includes the step of:

(e) controlling the reaction in response to the sequence of temperature values indicative of resin stickiness in the reactor in an effort to prevent unacceptable resin stickiness in the reactor (e.g., to maintain a current value of ΔMIT in a predetermined relationship with a predetermined limiting temperature value or range of values). For some embodiments of the invention in which the reaction controlled in step (e) is a polyethylene polymerization reaction using a metallocene catalyst (described below, and to be referred to herein as "Catalyst A"), the temperature value generated in step (d) is a temperature value ΔMIT that is at least substantially equal to $Trx-MIT_R$, and step (e) maintains (or attempts to maintain) the reaction parameters so that ΔMIT is in a predetermined limiting range from 5° C. to 6° C. (or less than a predetermined limiting value from 6° C. to 7° C.). Typically, $MIT_R$ is at least substantially equal to MIT-D, where MIT ("melt initiation temperature") is the dry MIT value determined in step (b), D is an estimated degree of MIT depression due to the presence of the at least one condensable gas with the resin in the reactor.

In typical embodiments, the temperature value determined in step (d) (e.g., the current value of ΔMIT) is used as a quantitative basis for controlling process conditions in the reactor so as to avoid discontinuity problems associated with excessive resin stickiness. For example, where the temperature value generated in step (d) is a temperature value ΔMIT which is at least substantially equal to $Trx-MIT_R$, the current value of ΔMIT can be used as a quantitative basis for controlling process conditions in the reactor to avoid process conditions that produce a ΔMIT value greater than a predetermined limiting value specific to the reaction, or a ΔMIT value outside a predetermined limiting range specific to the particular catalyst used in the reaction.

The temperature value determined in step (d) can also be used as a basis for maximizing reactor production rates. For example, where the temperature value generated in step (d) is a temperature value ΔMIT which is at least substantially equal to $Trx-MIT_R$, and the limiting (maximum) value of ΔMIT is in a range from 5° C. to 6° C., the reaction can be controlled using the current value of ΔMIT as feedback so as to proceed at a relatively high (but still safe) value of ΔMIT in the range from 2° C. to 5° C. This can provide the maximum safe condensed mode cooling capacity and maximum production rates.

During fluid bed reaction transitions (e.g., transitions to different polymer grades), conditions in the reactor can be adjusted to produce a new polymer grade of different density and/or melt index. In most cases, the adjustments in process conditions can be made fairly quickly, but some time is needed for the fluid bed to change over to the new resin properties. The time required to effect a complete transition is typically three or four bed turnovers. During a reaction transition, the bed-averaged properties (e.g., resin density and melt index) are not equal to the properties of the resin currently being produced (the "instantaneous production"). Therefore, it is possible to determine two different temperature values in step (d), one calculated with properties of the bed-averaged resin, and one calculated with properties of the instantaneous production. For reliable operation (without excessive resin stickiness) both temperature values must be less than a limiting value specific to the reaction, or within a limiting value range specific to the reaction.

Preferred embodiments generate reduced melt initiation temperature values (and ΔMIT values) based on bed-averaged parameters of steady-state polymerization reactions and use them to characterize and control the steady-state reaction. During transitions of such reactions, preferred embodiments generate reduced melt initiation temperature values (and ΔMIT values) based on instantaneous reaction parameters and use them to characterize and control the reactions during the transitions. For example, a steady-state reaction can be controlled to proceed with a ΔMIT value relatively close to a critical (or limiting) ΔMIT value. However, during a transition in such a reaction, the reaction should typically be controlled to proceed with a ΔMIT value (determined with instantaneous resin density and MI values in accordance with the invention) that is farther from the critical ΔMIT value. Preferably, for increased safety and more reliable operation without resin stickiness, the reaction should be controlled such that neither an "$\Delta MIT_{ave}$" temperature (indicative of the difference between current reactor temperature and a reference temperature above which resin having bed-averaged resin properties in the reactor is predicted to become sticky) nor an "$\Delta MIT_{inst}$" temperature (indicative of the difference between current reactor temperature and a reference temperature above which the resin currently being produced in the reactor is predicted to become sticky) exceeds a predetermined limit or leaves a predetermined range. The predetermined limit or range for $\Delta MIT_{ave}$ may differ from that for $\Delta MIT_{inst}$.

When controlling a reaction to prevent a ΔMIT value (generated in accordance with the invention) from exceeding a critical ΔMIT value (or leaving a critical ΔMIT range) the reactor temperature or ICA concentration may be adjusted (typically lowered) to bring the ΔMIT value back into an acceptable range. Adjustments in the reactor temperature Trx are generally preferred because of the relatively quick response times involved. If, for example the calculated value of ΔMIT were too high by 1° C., a reduction in reaction temperature of 1° C. would bring the ΔMIT back within range within a few minutes. Alternatively, an excessively high ΔMIT value may be corrected by lowering the concentration (or partial pressure) of ICA in the reactor. This may be done, for example, by reducing the rate of ICA feed to the reactor, or by increasing the rate of venting from the reactor. In either case, the rate of change in ICA concentration (or partial pressure) is relatively slow, normally requiring several hours to effect the intended change. For this reason, adjustments in the reactor temperature are generally preferred.

In typical embodiments, the predetermined correlation between the dry MIT values and the resin properties (density and MI) employed in step (b) is developed from laboratory data using a representative set of different types or grades of polymer resin that may be produced in the reactor. It is contemplated that in such embodiments, the dry melt initiation temperature can be determined or defined in any of a number of different ways. Preferably, the polymer density and melt index of the polymers in the set will span a full range of polymer density and melt index values that can be produced for each catalyst type to be used in the process. The measured data are typically then analyzed (and regressed) to provide a mathematical correlation of dry melt initiation temperature as a function of polymer density, melt index, and catalyst type (if required). Alternatively, the dry melt initiation temperature data are provided in the form of a predetermined database (a "Melt Reference Database") or look-up table, which can be accessed to determine a dry melt initiation temperature for polymer resin having measured density and/or melt index.

The database would preferably contain dry melt initiation temperature data for a dry version of each grade of polymer to be produced in the reactor.

In a preferred embodiment, the predetermined correlation employed in step (b) is developed from first melt DSC curves, measured in the laboratory with a group of samples representative of the different types or grades of polymer resin that may be produced in the reactor. Suitable DSC (Differential Scanning Calorimetry) data may be obtained by standard methods, well known to those skilled in the art. It is preferred, however, to use "first melt" data, that is data from previously unmelted granular polymer samples, since these samples are believed to be the most representative of the polymer as it exists in the reactor. Measured values of dry melt initiation temperatures determined from first-melt DSC measurements are set forth below in Table 1 for a group of low density polyethylene samples. The results of these measurements were correlated by the expression: $\text{MIT} = 763.4\rho - 1.7524 \circ \ln(\text{MI}) - 606.09$, where $\rho$ represents the density of the polymer (in units of g/cc, ASTM), and MI represents the melt index, $I_2$, of the polymer (in units of dg/min, ASTM). This expression is used in some embodiments of the invention to predetermine dry melt initiation temperatures for polymers not specifically listed in Table 1.

Appropriate engineering methods and correlations should be used to implement step (c) to determine a reduced melt initiation temperature. Typically, the reduced melt initiation temperature is determined as a function of reactor bed temperature and comonomer and diluent concentrations in the reactor. We describe below a method (suitable in many applications) for determining the reduced melt initiation temperature using the well-known Flory equation. The method employs measured values of condensable gas concentrations in the reactor (comonomer, ICA, and any other condensable inerts in the reactor) and expressions for solubilities of hydrocarbons in the polymer to compute an expected depression (or reduction) in the polymer melting curve and MIT. Using the method, the inventors found that the estimated degree of MIT depression typically varies with changes of condensable diluent gas partial pressures, and may be as high as 15-16° C. for typical metallocene resin products produced in condensed mode operation with high ICA concentrations.

In some embodiments, the temperature value generated in step (d) is a temperature value $\Delta$MIT and step (e) involves the step of controlling the reaction to maintain (or attempt to maintain) the current value of $\Delta$MIT below a predetermined limiting temperature value (or range of values). The limiting temperature value or range can be predetermined using historical reactor data that correlates reactor temperature with the formation of dome sheets, wall sheets, and rapid fouling of the distributor plate. Different predetermined limiting temperature values (or ranges) may be employed depending on the particular manner in which steps (b), (c), and (d) are performed. This does not pose a problem in performing embodiments of the inventive method as long as a consistent method of measurement and calculation is used throughout. In experiments performed by the inventors, historical data from a polyethylene polymerization reaction with a metallocene catalyst ("Catalyst A" to be described below) indicated that conditions of stickiness occur when a current value of $\Delta$MIT exceeds a limiting value in the range from about 5° C. to about 6° C. With the current value of $\Delta$MIT above that limiting value, the historical data indicated that continuity problems (dome sheeting, wall sheeting, and distributor plate fouling) were likely to occur with this catalyst.

In some embodiments, the temperature value generated in step (d) is a temperature value $\Delta$MIT which is at least substantially equal to $\text{Trx} - \text{MIT}_R$, and a running calculation of the current value of $\Delta$MIT is provided by application software running on a process control computer while the reaction proceeds. Current values of process data (bed temperature, ICA, comonomer, and isomer partial pressures, resin density, and melt index) are provided as inputs to the application software. Based on current values of resin density and melt index, the application software determines a dry MIT value from a predetermined correlation between dry MIT value and resin density and melt index. Based on current values of ICA, comonomer, and isomer partial pressures, and resin density and melt index (and the dry MIT value), the application software also determines a reduced melt initiation temperature $\text{MIT}_R$. The resulting running calculation of $\Delta$MIT provides the required running estimate of the degree of approach to conditions of limiting stickiness in the reactor. For some reactions, conditions of limiting stickiness occur when the current $\Delta$MIT value exceeds a limiting value in the range from 5° C. to 6° C.

In typical embodiments, process conditions are adjusted as required to avoid operation with the $\Delta$MIT value generated in step (d) greater than a limiting value (or outside a predetermined limiting value range). If the $\Delta$MIT value generated in step (d) approaches the limiting value (e.g., a value in the range from 5° C. to 6° C. in the case of some polyethylene polymerization reactions using metallocene catalyst A, to be described below) or approaches a limit of a limiting values range, control actions can be taken to avoid excessive resin stickiness. These control actions may include a reduction in the reactor bed temperature, a decrease in the ICA partial pressure, a decrease in the comonomer partial pressure, an increase in resin density, or any combination of these four.

In typical embodiments, process conditions are adjusted to allow safe operation at high condensed mode production rates. If the current $\Delta$MIT value generated in step (d) is significantly lower than the limiting value (or well within a limiting value range), changes can be made in reactor process conditions to increase the maximum heat transfer capability of the system. These actions may include an increase in the reactor bed temperature, or an increase in the ICA partial pressure. The increased reactor temperature can provide a higher temperature differential (over the cooling water temperature) for additional reactor cooling. The increased ICA partial pressure can provide a higher reactor gas dew point temperature, and correspondingly higher condensing levels in the reactor inlet gas stream.

In one embodiment, the invention is a method to monitor reactor operation and to control reactor operation to avoid problems caused by excessive resin stickiness. Current values of specific process variables (e.g., reactor temperature, ICA, comonomer, and isomer partial pressures, and resin density and melt index) are measured and used with predetermined mathematical correlations to determine a temperature value ($\Delta$MIT) indicative of resin stickiness in the reactor. The current value of $\Delta$MIT is compared to a previously determined limiting value or range of values. If the current $\Delta$MIT value approaches the limiting value (or approaches an end point of a limiting range of values), changes can be made in reactor process conditions to reduce the current $\Delta$MIT value to avoid the limiting value (or prevent it from leaving the limiting range of values), thereby avoiding discontinuity problems that would result from excessive stickiness. The control actions may include a reduction in the reactor temperature (i.e., reactor bed temperature), a decrease in ICA partial pressure, a decrease in comonomer partial pressure, an increase in resin density or any combination of these four.

In another embodiment, the invention is a method to monitor reactor operation (including by generating monitoring data on an on-line basis), and to control reactor operation (e.g., by generating reaction control data on an on-line basis) to avoid problems caused by excessive resin stickiness. Current values of specific process variables (e.g., reactor temperature, ICA, comonomer, and isomer partial pressures, and resin density and melt index) are measured on an on-line basis and used with predetermined mathematical correlations to determine a temperature value ($\Delta$MIT) indicative of resin stickiness in the reactor. The current value of $\Delta$MIT is compared to a previously determined limiting value or range of values. If the current $\Delta$MIT value approaches the limiting value (or approaches an end point of a limiting range of values), changes can be made in reactor process conditions to reduce the current $\Delta$MIT value to avoid the limiting value (or prevent it from leaving the limiting range of values), thereby avoiding discontinuity problems that would result from excessive stickiness. The control actions may include a reduction in the reactor temperature (i.e., reactor bed temperature), a decrease in ICA partial pressure, a decrease in comonomer partial pressure, an increase in resin density or any combination of these four.

In another embodiment, the invention is a method to monitor reactor operation (including by generating monitoring data on an on-line basis), and to control reactor operation (e.g., by generating reaction control data on an on-line basis) to allow safe operation at maximum reactor production rates, while still avoiding discontinuity problems caused by excessive resin stickiness. In this case, current values of specific process variables (e.g., temperature, ICA, comonomer, and isomer partial pressures, and resin density and melt index) are measured and used with predetermined mathematical correlations to determine a temperature value ($\Delta$MIT) indicative of resin stickiness in the reactor. The current value of $\Delta$MIT is compared to a previously determined limiting value or range of values. If the current $\Delta$MIT is significantly below the limiting value (or significantly far from the end points of a limiting range of values), changes can be made in reactor process conditions to increase the maximum heat transfer capability of the system. These actions may include an increase in the reactor bed temperature, or an increase in the ICA partial pressure. Increased reactor temperature can provide a higher temperature differential (over the cooling water temperature) for additional reactor cooling. Increased ICA partial pressure can provide a higher reactor gas dew point temperature, and correspondingly higher condensing levels in the reactor inlet gas stream.

In other embodiments, the invention provides an improved method for controlling reactor conditions during grade transitions. This is particularly important during transitions to very low density polymer grades (VLDPE) from higher density grades because the resin melting and sticking temperatures for the VLDPE grades are so low. To accomplish these transitions, reactor conditions must be adjusted to lower reaction temperature, lower ICA concentrations, lower production rates and lower resin densities. In commercial operations, these four variables must be changed quickly to minimize the production of off-specification material, while avoiding conditions which would result in the formation of excessively sticky polymer. Embodiments of the present invention integrate the impact of each these variables on the polymer sticking temperature, making it possible to guide the trajectory of the reactor transition so as to avoid excessive resin stickiness, and the discontinuity problems (sheeting, plate fouling and/or chunking) that would result. During a reaction transition, the bed averaged properties (e.g., resin density and melt index) are not equal to the properties of the resin currently being produced (the "instantaneous production"). Therefore, it is possible to determine (i.e., in step (d) of the inventive method) two different temperature values indicative of resin stickiness: one calculated with bed-averaged resin properties, and one calculated with properties of the instantaneous production. For reliable operation (without resin stickiness) both temperature values must be less than a limiting value specific to the reaction or within a limiting value range specific to the reaction.

BRIEF DESCRIPTION OF THE DRAWINGS

FIG. 1 is a simplified cross-sectional view of a reaction system including a fluidized bed reactor (10), whose operation can be monitored and optionally also controlled in accordance with the invention.

FIG. 2 is a block diagram of some elements of the FIG. 1 system and additional elements for implementing a process for calculating the control variables $MIT_R$ and $\Delta$MIT. These parameters may be calculated using on-line data from the reaction system and used to provide a real-time estimate of the degree of resin stickiness in the fluidized bed.

FIG. 3 is a first melt DSC curve generated from measured data for the polymer and catalyst listed in Row 6 of Table 1. A dry MIT value of 97.4° C. was determined from the initial inflection point of the DSC curve as shown in the figure.

FIG. 4 is the DSC curve of FIG. 3 and another first melt DSC curve that shows the effect of dissolved hydrocarbons in displacing (or "depressing") the DSC curve of FIG. 3 to lower values of temperature. The dissolved hydrocarbons also produce a reduction of the MIT to a lower value, denoted as $MIT_R$ as shown. The shift (or displacement) of MIT values (D) is computed using the Flory equation.

FIG. 5 is a first melt DSC curve with indications that illustrate a calculation of the control variable $\Delta$MIT as the difference between the reactor temperature (Trx) and the shifted value of the melt initiation temperature $MIT_R$.

DETAILED DESCRIPTION

A reactor system whose operation can be monitored and optionally also controlled in accordance with the invention will be described with reference to FIG. 1. The FIG. 1 system includes fluidized bed reactor 10. Reactor 10 has a bottom end 11, a top expanded section 19, a cylindrical (straight) section 14 between bottom end 11, and a distributor plate 12 within section 14. A fluidized bed 15 of granular polymer and catalyst particles is contained within the straight section 14. The bed is fluidized by the steady flow of recycle gas through the distributor plate 12. The flow rate of fluidizing gas is regulated to provide the fluidized bed with relatively good mixing, as illustrated in the figure.

The reactor system also has a catalyst feeder 9 for controlled addition of polymerization catalyst to the fluidized bed reaction zone. Within the reaction zone (i.e. the fluidized bed), the catalyst particles react with the ethylene and comonomer and optionally other reaction gas to produce granular polymer particles. As new polymer particles are produced, other polymer particles are continually withdrawn from the fluidized bed through a product discharge system (not shown). After passing through the product discharge system, the polymer granules are degassed (or "purged") with a flow of inert nitrogen to remove substantially all of the dissolved hydrocarbon materials.

The reactor system of FIG. 1 also has a cooling control loop which includes a recycle gas line 31, a circulating gas cooler 30 and compressor 32, coupled with reactor 10 as shown. During operation, the cooled circulating gas from cooler 30 flows through inlet 34 into reactor 10, then propagates upward through the bed and out from reactor 10 via outlet 33.

The expanded section 19 is also known as the "velocity reduction zone", and is designed to minimize the quantities of particle entrainment from the fluidized bed. Each diameter of each horizontal cross-section of the expanded section 19 is greater than the diameter of straight section 14. The increased diameter causes a reduction in the speed of the fluidizing gas, which allows most of the entrained particles (catalyst and resin particles) to settle back into the fluidized bed, thereby minimizing the quantities of solid particles that are "carried over" from the fluidized bed (at a given value of fluidizing gas velocity) through the recycle gas line 31.

One or more temperature sensors 16 may be located in the fluidized bed, and used with a control system (not shown in FIG. 1 but which can include processor 50 of FIG. 2) and an external cooling loop to control the fluidized bed temperature Trx near the process set-point. Relatively warm reactor gases (whose temperature has increased during its flow through reactor 10) is withdrawn from outlet 33 and is pumped by compressor 32 to cooler 30, wherein the temperature of the gas (the cooling fluid) is reduced. The relatively cool fluid from the cooler (which may contain condensed liquid) flows to the reactor inlet 34, to cool the fluidized bed. Temperature sensors (not shown) near the inlet and outlet of cooler may provide feedback to the control system to regulate the amount by which cooler 30 reduces the temperature of the fluid entering the reactor.

The FIG. 1 system also includes "skin temperature" sensors 8, mounted in positions along straight section 14 of the reactor wall so as to protrude into the bed from the reactor wall by a small amount (e.g., one eighth to one quarter of an inch). Sensors 8 are configured and positioned to sense the temperature $T_w$ of the resin near the wall of reactor 10 during operation.

The one or more temperature sensors 16 in the fluidized bed can include at least one resistance temperature sensor positioned and configured to sense bed temperature during reactor operation at a location within reactor 10 away from the reactor wall. The resistance temperature sensor can be mounted so as to protrude into the bed (e.g., 8 to 18 inches away from the reactor wall) more deeply than do sensors 8.

Other sensors and optionally also other apparatus may be employed to measure other reaction parameters during a polymerization reaction. Such other reaction parameters preferably include instantaneous and bed-averaged resin product properties (e.g., melt index and density of the polymer resin product being produced by the FIG. 1 system during a polymerization reaction). Resin product properties are conventionally measured by periodically sampling the resin as it exits the reactor (e.g. once per hour), and performing the appropriate tests in a quality control laboratory.

Other measured reaction parameters preferably include reactor gas composition, e.g., concentrations (and partial pressures) of all reactant gases and induced condensing agents (ICAs), as well as all inert gases (such as nitrogen, hydrocarbon inerts, etc.) that are present in relevant quantities. The reactor gas composition may be measured with a gas chromatograph system 40.

It is well known how to control various process control variables (e.g., to control gas phase composition within reactor 10, the concentration of induced condensing agents (ICAs) and comonomer introduced into reactor 10, partial pressure of at least one reactant (e.g., ethylene) introduced into reactor, and the type and properties of each catalyst introduced into reactor 10, and to use elements 30 and 32 in the manner described above to control temperature) to control various reactions performed by the FIG. 1 system. For example, it is known how to control a polymerization reaction during a transition by controlling process control variables such that the product (granular polymer resin) has properties compliant with an initial specification set at the start of the transition, the product produced during the transition ceases to comply with the initial specification set at a first time, and the product has properties compliant with a final specification set at the end of the transition.

In typical embodiments of the invention, a reaction (e.g., a steady-state reaction and/or a reaction transition) performed by a polymerization reactor is controlled by adjusting (or regulating) controlling process variables in response to at least one new control variable determined in accordance with the invention. The one or more new control variables of the invention (which typically include $MIT_R$ and $\Delta MIT$ as defined herein) are determined based on the output of sensors (and optionally also other apparatus) that measure reaction parameters. Processor 50 of FIG. 2 is an example of a processor programmed to generate such new control variables in accordance with any embodiment of the invention in response to reaction parameters (e.g., parameters determined by the output of temperature sensor 16, resin properties measurements (density and MI), and the process gas chromatograph 40) measured during a reaction, and to control the reaction in response to these temperature values. Processor 50 may be a separate, stand alone processor, or it may be integral with other process control computers that are conventionally used to monitor and control the reactor system.

We will describe several embodiments of the invention with reference to FIGS. 3-5. FIG. 3 shows a first melt DSC curve generated from measured data for the polymer listed in Row 6 of Table 1 (produced by polymerization using the catalyst listed in Row 6 of Table 1). The melt initiation temperature MIT is taken as the point of rapid onset of melting. Quantitative values may be obtained graphically as the intersection of the two tangent lines as shown. For this particular polymer, the peak melting temperature was determined 116.1° C., and the MIT was determined as 97.4° C.

FIG. 4 illustrates the effect of dissolved hydrocarbons in shifting (or "displacing" or "depressing") the polymer melt curve. The effect of these dissolved components, principally dissolved comonomer and ICA, is assumed in the present work to displace the entire melt curve (shown in FIG. 3 and also shown as a dashed curve in FIG. 4) towards lower temperatures, resulting in the displaced curve indicated in FIG. 4. The polymer peak melting temperature is displaced downwards, along with the MIT. The amount of displacement is denoted as D (in units of temperature, ° C.), and is calculated using the Flory equation and appropriate data (or correlations) for the solubility of condensable hydrocarbons in the polymer. The displaced value of MIT is denoted as $MIT_R$.

FIG. 5 illustrates a calculation of the control variable $\Delta MIT$. This is computed as $\Delta MIT = Trx - MIT_R$, and represents the extent by which the reactor bed temperature exceeds (or "overlaps") the displaced value of the MIT. The physical units of $\Delta MIT$ are temperature, in degrees C. The $\Delta MIT$ incorporates all known process variables that affect resin stickiness (e.g., resin density and MI, reactor temperature Trx, and hydrocarbon concentrations and solubilities) into a single variable that can be monitored on-line (during a reaction) and used as the basis for control of the reactor to prevent problems associated with excessive stickiness, and/or to maximize reactor production rates. Limiting values of ΔMIT correspond to limiting values of stickiness, and may be different for different catalyst systems. For polymers produced with Catalyst A (a metallocene catalyst described below) the limiting value of ΔMIT was determined to be in the range of 6 to 7° C.

Embodiments of the present invention determine an estimated degree of depression of a dry melt initiation temperature for a polymer resin due to presence of at least one diluent (e.g., ICA, comonomer, and at least one isomer of the comonomer) with the resin in a reactor during a polymerization reaction, from at least one parameter of the reaction and using a predetermined melt initiation temperature depression model based on the Flory equation. As discussed above, the presence of condensable diluent (e.g., comonomer and condensing agents, and isomers of comonomers) depresses the dry melt initiation temperature of polymer resin (e.g., polyethylene) in a gas phase polymerization reactor. The magnitude of the depression of the dry melt initiation temperature may be sufficient to bring the reduced melt initiation temperature near the reaction temperature. The model employed in the noted embodiments relates the dry melt initiation temperature of a dry version of the polymer resin (which itself is typically determined by a predetermined correlation with resin melt index and density) and the reduced melt initiation temperature of the polymer resin in the presence of significant amounts of the diluent components (typically soluble hydrocarbons) that are present with the resin while the resin is produced. By processing data indicative of the reactor temperature, and the concentration, solubility, and liquid densities of the diluent components in accordance with the model, the reduced melt initiation temperature can be determined in accordance with the invention from the dry melt initiation temperature. The model (sometimes referred to herein as a melt initiation temperature depression model or MIT depression model) can be readily programmed into a stand-alone computer or a conventional plant DCS system to provide a monitor of combinations of process conditions that lead to resin stickiness. This allows operations to adjust reactor conditions to avoid sheeting incidents.

Other embodiments of the present invention determine an estimated degree of depression of a dry melt initiation temperature for a polymer resin due to presence of at least one diluent (e.g., ICA, comonomer, and at least one isomer of the comonomer) with the resin in a reactor during a polymerization reaction, from at least one parameter of the reaction measured on an on-line basis and using a predetermined melt initiation temperature depression model based on the Flory equation. As discussed above, the presence of condensable diluent (e.g., comonomer and condensing agents, and isomers of comonomers) depresses the dry melt initiation temperature of polymer resin (e.g., polyethylene) in a gas phase polymerization reactor. The magnitude of the depression of the dry melt initiation temperature may be sufficient to bring the reduced melt initiation temperature near the reaction temperature. The model employed in the noted embodiments relates the dry melt initiation temperature of a dry version of the polymer resin (which itself is typically determined by a predetermined correlation with resin melt index and density) and the reduced melt initiation temperature of the polymer resin in the presence of significant amounts of the diluent components (typically soluble hydrocarbons) that are present with the resin while the resin is produced. By processing data indicative of the reactor temperature, and the concentration, solubility, and liquid densities of the diluent components in accordance with the model, the reduced melt initiation temperature can be determined in accordance with the invention from the dry melt initiation temperature. The model (sometimes referred to herein as a melt initiation temperature depression model or MIT depression model) can be readily programmed into a stand-alone computer or a conventional plant DCS system to provide an on-line monitor of combinations of process conditions that lead to resin stickiness. This allows operations to adjust reactor conditions to avoid stickiness and reduce the likelihood of sheeting incidents.

The noted embodiments include the steps of: determining a dry melt initiation temperature for polymer resin being produced, preferably by characterizing a DSC (differential scanning calorimetry) melting curve for a dry version of the resin being produced; and estimating the amount by which the dry melt initiation temperature is depressed due to the presence of the condensable diluent component(s) actually present with the resin being produced in the reactor. In characterizing such a DSC melting curve, an inflection point in the DSC melting curve is typically identified as the dry melt initiation temperature (MIT). Using the Flory equation, these embodiments determine a reduced melt initiation temperature ($MIT_R$) at which the resin in the reactor will begin to melt in the presence of the condensable diluent gases (e.g., soluble hydrocarbons) that are present with the resin during the reaction. The reduced melt initiation temperature, $MIT_R$, is at least substantially equal to MIT−D, where MIT is the dry melt initiation temperature, and D is an estimated degree of MIT depression, caused by the soluble diluent gas components in the reactor.

The methodology for estimating the depression D of the dry melt initiation temperature may be based on the Flory equation and existing models for vapor solubility in the polymer resin. The noted embodiments typically determine a single calculated parameter, ΔMIT, which is the difference between the reactor temperature, Trx, and $MIT_R$, to quantify the degree to which the reactor temperature overlaps the (depressed) melting curve, and thus quantify the degree of resin stickiness.

The expression "DSC melting curve" for dry version of polymer resin herein denotes an experimentally determined relationship between the rate at which heat is absorbed by a sample of the dry resin (e.g., in units of mcal/sec) versus temperature of the sample, as determined from DSC melting curve data resulting from differential scanning calorimetry measurements on the sample. Two types of DSC melting curves are "first melt" and "second melt" curves. A first melt curve is determined by measurements on a sample that has not previously been melted. A second melt curve is determined by measurements on a sample that has previously been melted, in the sense that the sample is melted in a first scan through the DSC, then cooled back to ambient temperature, and then slowly reheated for the second DSC test. DSC melting curves employed in preferred embodiments of the invention are first melt curves, since first melt data are believed to reflect the true melt curve of polymer resin as it exists in a polymerization reactor more accurately than second melt data.

Some embodiments of the inventive method that employ a melt initiation temperature depression model (e.g., one based on and implementing the Flory equation) include the steps of:

during a polymerization reaction in a fluid bed reactor which produces a polymer resin, measuring current values of parameters of the reaction including reactor temperature, at least one resin property (e.g., density and melt index) of the polymer resin, and concentration (e.g., partial pressure) of at least one condensable diluent gas in the reactor (e.g., partial pressures of ICA, comonomer, and at least one isomer of the comonomer in the reactor);

determining, from at least one of the current values of the at least one resin property based on a predetermined correlation between resin melting temperature and said at least one resin property, a dry melt initiation temperature value ("dry MIT value" or "MIT") indicative of a temperature at which a dry version of the polymer resin is expected to begin to melt (e.g., a temperature at which the polymer resin in the reactor is expected to begin to melt in the absence of any significant amount of condensable diluent gas that is actually present in the reactor during the reaction). Typically, the dry MIT value is determined using a database including previously measured MIT values (determined from DSC measurements) as a function of resin properties (density, MI, etc.);

during the reaction, using a melt initiation temperature (MIT) depression model to determine a reduced melt initiation temperature at which the polymer resin is expected to begin to melt in the presence of the at least one condensable diluent gas in the reactor, said model identifying an estimated degree of depression of the dry MIT value due to presence of at least one diluent with the polymer resin (e.g., the presence of the condensable diluent gas actually present with the polymer resin in the reactor during the reaction). Preferably, the MIT depression model implements the Flory equation; and determining a temperature value indicative of resin stickiness in the reactor, from the reduced melt initiation temperature determined in step (c) and a current value of the reactor temperature.

Steps (b) and (c) can be performed in any of a variety of ways, including by accessing one or more look-up tables prepared in accordance with the predetermined correlation or the model.

Additional embodiments of the inventive method that employ a melt initiation temperature depression model (e.g., one based on and implementing the Flory equation) include the steps of:

during a polymerization reaction in a fluid bed reactor which produces a polymer resin, measuring current values of parameters of the reaction including reactor temperature, at least one resin property (e.g., density and melt index) of the polymer resin, and concentration (e.g., partial pressure) of at least one condensable diluent gas in the reactor (e.g., partial pressures of ICA, comonomer, and at least one isomer of the comonomer in the reactor);

determining, from at least one of the current values of the at least one resin property based on a predetermined correlation between resin melting temperature and said at least one resin property, a dry melt initiation temperature value ("dry MIT value" or "MIT") indicative of a temperature at which a dry version of the polymer resin is expected to begin to melt (e.g., a temperature at which the polymer resin in the reactor is expected to begin to melt in the absence of any significant amount of condensable diluent gas that is actually present in the reactor during the reaction). Typically, the dry MIT value is determined using a database including previously measured MIT values (determined from DSC measurements) as a function of resin properties (density, MI, etc.);

during the reaction, using a melt initiation temperature (MIT) depression model to determine in on-line fashion a reduced melt initiation temperature at which the polymer resin is expected to begin to melt in the presence of the at least one condensable diluent gas in the reactor, said model identifying an estimated degree of depression of the dry MIT value due to presence of at least one diluent with the polymer resin (e.g., the presence of the condensable diluent gas actually present with the polymer resin in the reactor during the reaction). Preferably, the MIT depression model implements the Flory equation; and determining in on-line fashion a temperature value indicative of resin stickiness in the reactor, from the reduced melt initiation temperature determined in step (c) and a current value of the reactor temperature.

Steps (b) and (c) can be performed in any of a variety of ways, including by accessing one or more look-up tables prepared in accordance with the predetermined correlation or the model.

Typically, the reduced melt initiation temperature determined in step (c) is a temperature ($MIT_R$) above which resin in the reactor (in the presence of condensable diluent gas) is predicted to begin to melt. In some embodiments, the temperature value generated in step (d) is a temperature value, $\Delta MIT$, which is at least substantially equal to $Trx-MIT_R$, where Trx is the current reactor temperature, and $MIT_R$ is the reduced melt initiation temperature determined in step (c). Typically, $MIT_R$ is at least substantially equal to $MIT-D$, where MIT ("melt initiation temperature") is the dry MIT value determined in step (b), D is an estimated degree of MIT depression due to the presence of the at least one condensable diluent gas with the resin in the reactor. In other embodiments, the temperature value generated in step (d) is a temperature value otherwise indicative of the degree of resin stickiness in the fluid bed.

Preferably, steps (a)-(d) are performed repeatedly (e.g., on an ongoing basis) during the reaction to generate a sequence of temperature values indicative of resin stickiness in the reactor (e.g., a sequence of values of $\Delta MIT$ or data indicative of a time-varying value of $\Delta MIT$), and the method also includes the step of:

(e) controlling the reaction to maintain (or attempt to maintain) resin stickiness in the reactor in a predetermined relationship with a predetermined limiting value or range of values (e.g., to maintain a current value of $\Delta MIT$ in a predetermined relationship with a predetermined limiting temperature value or range of values).

For some embodiments in which the reaction controlled in step (e) is a polyethylene polymerization reaction using a metallocene catalyst to be referred to as Catalyst A (described below), and the temperature value generated in step (d) is a temperature value $\Delta MIT$ which is at least substantially equal to $Trx-MIT_R$. Such a temperature value $\Delta MIT$ has been correlated with measured data characterizing the same type of polyethylene polymerization reaction (performed using Catalyst A) at a commercial gas phase reactor. The data characterized several wall and dome sheeting incidents that occurred during the reaction, as well as normal operation that occurred without sheeting. The correlation determined that when the $\Delta MIT$ value exceeded a critical value (determined to be in the range 6° C. to 7° C.), the likelihood of sheeting increased significantly. The correlation also determined that maintaining the $\Delta MIT$ value below this critical value is critical to avoid both wall and dome sheeting during a reaction of the type analyzed. Thus, in the noted embodiments, step (e) preferably maintains (or attempts to maintain) the reaction parameters so that $\Delta MIT$ is in a predetermined limiting range from 5° C. to 6° C. (or less than a predetermined limiting value from 6° C. to 7° C.).

For some other polyethylene polymerization reactions using a catalyst other than above-noted Catalyst A, the temperature value generated in step (d) is a temperature value $\Delta MIT$ which is at least substantially equal to $Trx-MIT_R$, and step (e) maintains (or attempts to maintain) the reaction parameters so that $\Delta MIT$ is in a predetermined limiting range which is found (in commercial experience) to be appropriate for that catalyst. With these other catalyst systems the range of $\Delta MIT$ values required to avoid excessive resin stickiness may be different than 5° C. to 6° C. The limiting ΔMIT values (or range of values) for these catalysts are taken as those that are found to correlate with discontinuity events (sheeting, chunking and/or rapid fouling of the distributor plate) with the particular catalyst in a commercial reactor system.

We next describe an example of performance of step (c), assuming that a dry melt initiation temperature value has been determined in step (b).

From thermodynamic considerations, the presence of a soluble, condensable substance (e.g., a hydrocarbon) reduces the melting temperature of a polymer. A relationship, known as the Flory equation, for the melting point depression of a high molecular weight polymer by a diluent is given in Fried, J. R., *Polymer Science and Technology*, Prentice Hall, Upper Saddle River, N.J., 1995, as:

$$\frac{1}{T_m} - \frac{1}{T_m^0} = \left(\frac{R}{\Delta Hu}\right)\left(\frac{Vu}{Vs}\right)(\phi_1 - \chi\phi_1^2) \quad (1)$$

where:
R is the gas constant,
Vu is the molar volume of the polymer repeat unit,
Vs is the molar volume of the diluent,
$T_m$ is the peak melting temperature of the polymer with diluent (° C.),
$T_m^0$ is the peak melting temperature of the polymer without diluent (° C.),
ΔHu is the enthalpy of fusion for the polymer repeat unit (850.6 cal/mol),
$\phi_1$ is the volume fraction of diluent (single or multi-component), and
χ is a binary interaction parameter,
The parameter χ is defined by the above reference as:

$$\chi = \chi_S + \chi_H = \chi_S + \frac{V_1}{RT}(\delta_1 - \delta_2)^2 \approx 0.34 + \frac{V_1}{RT}(\delta_1 - \delta_2)^2 \quad (2)$$

where:
$\delta_1$ is the solubility parameter of the diluent, and
$\delta_2$ is the solubility parameter of the polymer.
For a diluent that is a mixture of gases:

$$\delta_1 = \delta_{mix} = \Sigma \delta_i f_i \quad (3)$$

where $f_i$ is the volume fraction of diluent component i, and $\delta_i$ is the solubility parameter of component i, and where the sum of volume fractions for all diluent components equals 1. Equation 3 is substituted into Equation 2 to calculate χ for mixtures.

Solving for Tm in Equation 1, the following expression is obtained:

$$Tm = \frac{1}{\frac{1}{Tm^0 + 273.15} + \left[\frac{R}{\Delta Hu} \cdot \frac{Vu}{Vs} \cdot (\phi_1 - \chi \cdot \phi_1^2)\right]} - 273.15 \quad (4)$$

This equation predicts the peak melting temperature of a polymer as a function of soluble components. In the example, $T_m^0$ is the peak melt temperature determined from a first melt DSC curve for the polymer, and $T_m^0$ is the peak melt temperature expected for the polymer in the presence of the diluent. From thermodynamic considerations, the effect of the soluble diluents is to reduce (or "depress") the peak melting temperature, hence $T_m$ is always less than $T_m^0$ in the presence of one or more soluble diluents, and the difference $T_m^0 - T_m$ is always positive.

In the present example, it is necessary to estimate the degree of depression of the melt initiation temperature, MIT. The required depression of the MIT is taken as equal to the depression of the peak melting temperature, as determined above from the Flory equation. Defining the parameter D as the depression (or displacement) of the melt initiation temperature, $$D = T_m - T_m^0 \quad (5)$$

The reduced melt initiation temperature is determined in step (c) from the melt initiation temperature (determined in step (b)) as:

$$MIT_R = MIT - D \quad (6)$$

In the example, the temperature value generated in step (d) is a temperature value ΔMIT=Trx−$MIT_R$, where Trx is the current reactor temperature, and $MIT_R$ is given by Equation 6. The value ΔMIT is the difference between the reactor temperature (Trx) and the melt initiation temperature of the polymer, accounting for the depression in melting point for soluble hydrocarbons. A positive value of ΔMIT indicates the extent to which the reactor temperature exceeds the depressed melt initiation temperature.

In order to use Equation 4, relationships for the solubility of diluent components in the polymer are required. One such generalized relationship, described in Stiel, L. I., et al., *J. Appl. Poly. Sci.*, v. 30, 1145-1165, 1985, provides an estimate of a Henry's Law constant as:

$$\ln\left(\frac{1}{Kp}\right) = -1.561 + (2.057 + 1.438\omega)\left(\frac{Tc}{T}\right)^2 \quad (7)$$

where:
Kp is the Henry's Law constant,
ω is an acentric factor,
Tc is the critical temperature of the diluent (° K), and
T is the temperature (° K).

To calculate the vapor solubility, the following equation was presented by Stiel, et al, (cited above):

$$Py_1 = Kp \cdot V_1^0 \quad (8)$$

where:
P is the reactor total pressure (atm),
$y_1$ is vapor phase mole fraction, and
$V_1^0$ is vapor solubility in $cm^3$ diluent/g polymer at 273.2° K and 1 atmosphere pressure.

By combining Equations 7 and 8, the vapor solubility of diluent (in units of weight fraction) can be expressed as:

$$S = P \cdot Mw \cdot \frac{\exp\left(-1.561 + (2.057 + 1.438\omega)\left(\frac{Tc}{T}\right)^2\right)}{R \cdot Ta} \quad (9)$$

where:
Ta is 273.15 (° K),
R is the gas constant (82.06 cm³·atm/mol·° K), and
Mw is the molecular weight of the diluent, or:

$$S = P \cdot Mw \cdot \frac{\exp\left(-1.561 + (2.057 + 1.438\omega)\left(\frac{Tc}{T}\right)^2\right)}{22414.7} \tag{10}$$

If P is in units of bars (rather than atmospheres), the constant in the denominator of Equation 10 is 22710.9.

Component properties, such as Tc, ω and Mw may be found in Reid, R. C., et al., *The Properties of Gases and Liquids*, 4$^{th}$ ed., McGraw-Hill, New York, 1987. To calculate the melting point depression by Equation 4, the volume fraction of diluent φ in the polymer must be estimated. Assuming additive volumes, the following relationship applies:

$$\phi_{mix} = \frac{\frac{Ms}{\rho s}}{\frac{Ms}{\rho s} + \frac{1-Ms}{\rho p}} \tag{11}$$

where:
Ms is the mass fraction of diluent,
ρs is the density of the diluent (in g/cm³), and
ρp is the density of the polymer (in g/cm³)

Other vapor solubility equations can be used as alternatives to Equation 10. For example, for polymerization reactions in which ethylene is present and isopentane is used as a diluent, the following relationship for vapor solubility S (in units of weight fraction) can be used:

$$S = a(1-\rho)^{b1} MI^c e^{d/Trx} P^e \tag{12}$$

where MI is the polymer melt index, I$_2$ (g/10 min), ρ is the polymer density (g/cm³), Trx is the reactor temperature (in ° K), P is the hydrocarbon partial pressure at the resin conditions (in psia), and a, b1, c, d, and e are predetermined parameters.

As another example, for polymerization reactions in which 1-butene and 1-hexene are diluents, the following relationship for vapor solubility S (in units of weight fraction) can be used:

$$S = aPe^{\left(\left(b1+\frac{b2}{T}-b3\right)P\right)} e^{c/Trx} (1-\rho)^d MI^e \tag{13}$$

where (again) MI is the polymer melt index (I$_2$, g/10 min), ρ is the polymer density (g/cm³), Trx is the reactor temperature (in ° K), P is the hydrocarbon partial pressure at the resin conditions (in psia), and a, b1, c, d, and e are predetermined parameters.

In the example, diluent mixture molar volumes are required. Well known methods such as the Rackett method using the Chueh-Prausnitz mixing rules or the Hankinson-Brobst-Thomson method for mixtures may be used. Molar volumes used herein were calculated using the modified Rackett method using the Chueh-Prausnitz mixing rules (as described in Reid, R. C., et al., *The Properties of Gases and Liquids*, 4$^{th}$ ed., McGraw-Hill, New York, 1987).

To estimate χ in Equation 4, the volume fraction of each soluble component is also required. In the example, the χ parameter was computed by modifying Equation 2 as follows:

$$\chi = 0.34 + \frac{V_i}{RT_{rx}}\left(\sum_i \delta_i \frac{S_i}{\sum_i S_i} - \delta_P\right) \tag{14}$$

where:
$\delta_P$ is polymer solubility parameter,
$\delta_i$ is the solubility parameter of diluent component i,
$S_i$ is defined by Equation 10, and
The temperature T is taken as Trx.

In the example, melt DSC measurements were made for a series of polymers (produced with a variety of catalysts) before step (b) was performed. Table 1 shows the melt index (MI) and density (ρ) of each polymer, the catalyst employed to produce the polymer (and included with the polymer sample measured), and the melt initiation temperature and peak melt temperature determined for the polymer. The density of the polymers ranged from 0.909 to 0.966 g/cm³ and their melt indices ranged from 0.81 to 19.0 g/10 min.

In Table 1 and elsewhere herein polymer density refers to density measured in accordance with ASTM 1505 and ASTM D-1928. A plaque is made and conditioned for one hour at 100° C. to approach equilibrium crystallinity; measurement for density is then made in a density gradient column. The melt index (MI) is measured in accordance with ASTM D 1238-E (190° C., 2.16 kg).

In Table 1 and elsewhere herein, "Catalyst A" is a metallocene catalyst described in PCT Application Publication Number WO9961486A1 (published on Dec. 2, 1999), wherein it is also designated as "Catalyst A." PCT Application Publication No. WO9961486A1 teaches (on page 29) the following method for preparing this catalyst: "Davison grade 948 silica (available from W.R. Grace, Davison Chemical Division, Baltimore, Md.) was dehydrated to 600° C. and used as the support. The dehydrated silica (850 g) was charged into a 2 gal. reactor and 1060 ml of 30 wt % methylaluminoxane (MAO) (available from Albemarle Corporation, Baton Rouge, La.) was added with slow agitation. Toluene (2000 ml) was then charged to the reactor and the mixture was allowed to stir at 150° F. (66° C.) for 4 hours. Following the MAO reaction time, 23 grams of bis-(1,3-methyl-n-butyl cyclopentadienyl)zirconium dichloride was added as a 10 wt % solution in toluene. Reaction time for the bulky ligand metallocene-type catalyst compound was 1 hour after which the catalyst system was dried with N2 under a vacuum. Drying time was 3 hours at 150° F. (66° C.) and at a reduced agitator speed of 30 rpm. A total of 1200 grams of dried free flowing catalyst was isolated."

In Table 1 and elsewhere herein, "Catalyst B" is a metallocene catalyst described in PCT Application Publication Number WO9961486A1 (published Dec. 2, 1999). The catalyst is identified as "Catalyst D" in the publication, and is based on a "bulky ligand metallocene-type catalyst compound", dimethylsilyl-bis(tetrahydroindenyl)zirconium dichloride (Me$_2$Si(H$_4$Ind)$_2$ZrCl$_2$), which is available from Albemarle Corporation, Baton Rouge, La." PCT Application Publication No. WO9961486A1 teaches (page 32, line 11, to page 33, line 11) the following method for preparing this catalyst: "The (Me$_2$Si(H$_4$Ind)$_2$ZrCl$_2$) catalyst compound was prepared on Crosfield ES-70 grade silica which is dehydrated at 600° C. having an approximately a 1.0 weight percent water content. The Crosfield ES-70 grade silica having an Average Particle Size of 40 microns is available from Crosfield, Manchester, England. The first step in the manufacture of the supported metallocene-type catalyst above involves forming a precursor solution. 460 lbs (209 kg) of sparged and dried toluene is added to an agitated reactor after which 1060 lbs (482 kg) of a weight percent methylaluminoxane (Albemarle Corp., Baton Rouge, La.) is added. 947 lbs (430 kg) of a 2 weight percent toluene solution of a dimethyl silylbis (tetrahydroindenyl)zirconium dichloride catalyst compound and 600 lbs (272 kg) of additional toluene are introduced into the reactor. The precursor solution is then stirred at 80° F. to 100° F. (26.7 to 37.8° C.) for one hour. While stirring the precursor solution above, 850 lbs (386 kg) of 600° C. dehydrated silica as described above is added slowly to the precursor solution and the mixture agitated for 30 min. at 80° F. to 100° F. (26.7 to 37.8° C.). At the end of the 30 min. agitation of the mixture, 240 lbs (109 kg) of a 10 weight percent toluene solution of AS-990 (N,N-bis(2-hydroxylethyl)octadecylamine ($C_{18}H_{37}N(CH_2CH_{20}H)_2$) available as Kemamine AS-990 (from) Witco Corporation, Memphis, Tenn., is added together with an additional 10 lbs (50 kg) of a toluene rinse and the reactor contents then mixed for 30 min. while heating to 175° F. (79° C.). After 30 min. vacuum is applied and the catalyst mixture dried at 175° F. (79° C.) for about 15 hours to a free flowing powder. The final catalyst weight was 1200 lbs (544 kg) and had a Zr wt % of 0.35 and an Al wt % of 12.0."

In Table 1 and elsewhere herein, "Catalyst C" is a supported Ziegler-Natta catalyst prepared according to U.S. Pat. No. 4,302,566. This catalyst is prepared in three steps. In the first step, W.R. Grace & Co. 955 silica dehydrated at 600° C. is reacted with triethylaluminum (AlEt3) at 60° C. in isopentane, solvent is removed and the resulting product is dried. In the second step, a solution of MgCl2 and TiCl3.1/3AlCl3 dissolved in THF is mixed at 60° C. with the product formed in the first step, solvent is removed and the resulting product is dried to reduce the THF concentration in the product to the range of 0.13 to 0.15. In the third step, the product formed in the second step is reacted with Et2AlCl and Al(n-hexyl)3 at 60° C. in isopentane, the solvent is removed and the product is dried. The quantity of Et2AlCl used in the third step is such that the molar ratio of Et2AlCl/THF is 0.50. The quantity of Al(n-hexyl)3 used in the third step is such that the molar ratio of Al(n-hexyl)3/THF is 0.30.

For each polymer evaluated, only the first melt DSC was used because this is believed to be more representative of the polymer as it exists in the reactor than the more conventional second melt DSC curves. The second melt DSC curves may be significantly different than first melt DSC curves, typically showing lower peak melting temperatures and a sharper melt peak. In the data of Table 2 below, the DSC curves were generated with a temperature ramp rate of 10° C./minute, and with a typical sample quantity of 4.5 mg.

TABLE 1

| Catalyst | Melt Init. Temp (° C.) | Peak Melt Temp (° C.) | Melt Index (dg/min, ASTM) | Density (g/cc, ASTM) |
|---|---|---|---|---|
| A | 87.1 | 114.2 | 0.97 | 0.909 |
| A | 86.0 | 110.1 | 7.83 | 0.912 |
| A | 85.1 | 113.3 | 1.03 | 0.913 |
| A | 85.5 | 108.4 | 11.7 | 0.912 |
| A | 86.0 | 110.2 | 5.11 | 0.912 |
| A | 97.4 | 116.1 | 1.04 | 0.917 |
| A | 96.4 | 122.2 | 0.81 | 0.924 |
| A | 95.5 | 113.3 | 3.37 | 0.917 |

TABLE 1-continued

| Catalyst | Melt Init. Temp (° C.) | Peak Melt Temp (° C.) | Melt Index (dg/min, ASTM) | Density (g/cc, ASTM) |
|---|---|---|---|---|
| C | 111.2 | 127.5 | 1.9 | 0.942 |
| C | 125.8 | 135.5 | 8.2 | 0.966 |
| C | 97.0 | 121.8 | 1.0 | 0.918 |
| C | 97.7 | 119.5 | 2.0 | 0.918 |
| C | 95.0 | 122.6 | 22 | 0.925 |
| C | 108.7 | 127.0 | 3.3 | 0.935 |
| C | 116.0 | 128.1 | 19 | 0.953 |
| B | 96.9 | 113.8 | 1.06 | 0.921 |
| B | 85.4 | 110.6 | 4.55 | 0.912 |

The peak melt temperature for each polymer sample was determined from the DSC measurements. A melt initiation temperature (i.e., the dry MIT) for each polymer was determined as the initial point of inflection of a DSC curve (preferably a first melt DSC curve) for the polymer, as illustrated in FIG. 3.

It is contemplated that in alternative embodiments, the melt initiation temperature for each polymer could be determined in other ways. An inflection point of a DSC curve (generated from measurements on a sample of a dry version of the polymer with no significant amount of diluent hydrocarbon present therewith) is a point of rapid onset of melting as indicated by the DSC curve, and thus the temperature at which the inflection point occurs can determine a dry melt initiation temperature.

An inflection point in a DSC melting curve (occurring at a temperature to be considered the melt initiation temperature) can be identified graphically from the DSC curve. For example, such an inflection point can be identified by locating the peak melt temperature indicated by the DSC curve (the temperature at which heat is absorbed most rapidly by the sample) and determining a line segment of a linear approximation of each of a sequence of different portions of the DSC curve (and the slope of each such line segment), where the end points of each such curve portion span the same predetermined range of temperatures but each curve portion is centered at a different temperature below the peak melt temperature. Then, for consecutive pairs of the line segments having decreasing center temperatures (i.e., for center temperatures that decrease from the peak melt temperature), identifying the difference between the slopes of each such pair, identifying the first pair of line segments (for two consecutive portions of the curve portions) for which the line segment slope difference is indicative of an inflection point of the DSC curve, and identifying (as the inflection point of the DSC curve) the temperature at which the line segments of this pair intersect. The inflection point of the DSC curve for each polymer is considered to be the dry melt initiation temperature value MIT for the polymer.

The melt initiation temperatures listed in Table 1 are the dry melt initiation temperatures (MIT values) for the relevant polymers. The melt initiation temperatures listed in Table 1 were regressed to determine a "best fit" by least squares using the density and natural logarithm of the melt index (ln(MI)) for the relevant polymers. The regression line was:

$$MIT = 763.4\rho - 1.75241 \ln(MI) - 606.09 \quad (15)$$

where ρ represents the density of the polymer (in units of g/cc, ASTM), and MI represents the melt index, $I_2$, of the polymer (in units of dg/min, ASTM).

In some embodiments, Equation 15 is used to determine the dry melt initiation temperature (MIT) for polymers other than those specifically listed in Table 1. In Equation 15, no term is employed to account for the specific catalyst type used to produce the polymer. This is appropriate since all combinations of polymer and catalyst type for which DSC measurements were performed were found to fit the correlation of Equation 15. However, it is anticipated that polymers produced by other catalyst systems (i.e. other than Catalysts A, B or C) may have MIT values that do not fit the regression curve defined by Equation 15.

The inventors have coded into an Excel spreadsheet the above-described melt initiation temperature depression model which uses Equations 4, 9, 10, and 11, for application to polymerization of polyethylene with typical condensable gas components (C4 olefins, C4 saturates, C6 olefins, C6 saturates and isopentane). Solubility parameters for these gases were obtained from the *Chemical Properties Handbook* ©1999, and are listed in Table 2 below. A value for the solubility parameter of polyethylene was obtained from an average of several values that are listed for polyethylene in the *Polymer Handbook*, $4^{th}$ ed.

TABLE 2

| Solubility Parameters $((cal/cm^3)^{1/2})$ | |
|---|---|
| 1-Butene | 6.717 |
| n-Butane | 7.062 |
| Isopentane | 6.771 |
| 1-Hexene | 7.352 |
| n-Hexane | 7.323 |
| Polyethylene | 7.95 |

Table 3 shows an exemplary calculation, performed using the coded melt initiation temperature depression model for a polymer of the type produced by Catalyst A, with a melt index (MI) of 1.0 dg/min (ASTM), and a density of 0.918 g/cc (ASTM), being produced in a fluid bed reactor. The calculation was based on assumed values of condensable diluent gas concentrations, temperature, and pressure (as provided in the table) that are believed to be representative of Catalyst A in commercial operation.

TABLE 3

| | |
|---|---|
| 1-Hexene partial pressure (bar) | 0.217 |
| Isopentane partial pressure (bar) | 3.45 |
| Reactor temperature, Trx (° C.) | 85 |
| Reactor pressure (bar) | 21.7 |
| Polymer peak melting temp., $T_m^0$ (° C.) | 115.86 |
| Melt point depression, D (° C.) | 13.00 |
| Reduced peak melting temp., $T_m$ (° C.) | 102.86 |
| Melt initiation temp., MIT (° C.) | 94.71 |
| Reduced MIT, $MIT_R$ (° C.) | 81.71 |
| ΔMIT, at Trx = 85° C., (° C.) | 3.38 |

In the exemplary calculation, the dry melt initiation temperature (MIT) for the polymer was determined from the correlation of Equation 15. The melting point depression D was determined from Equations 4, 9, 10, and 11, (using the indicted values of temperature and diluent gas concentrations), and the resulting calculated value was 13° C. A value of reduced melt initiation temperature $MIT_R$ was determined as the difference MIT−D, which produced an estimated value of 81.71° C. Since this was lower than the reactor temperature (Trx) of 85° C., the calculation thus determined that (this example) system was operating with a positive value of ΔMIT equal to 3.38° C. Since this was less than the limiting range of ΔMIT values that apply for Catalyst A (5 to 6° C.), the reactor system would be expected to operate at the conditions above without excessive resin stickiness in the fluidized bed and, consequently, without an increased tendency for discontinuity events such as sheeting, chunking or distributor plate fouling caused by excessive stickiness.

Embodiments of the inventive method which use the above-described MIT depression model allow linkage of resin properties and reactor operating conditions to predict operating conditions under which discontinuity events due to resin stickiness can be avoided during start-ups as well as steady-state operation. These embodiments also allow reactor production rates to be safely maximized while minimizing the potential for discontinuity events, and allow production rates to be maximized (i.e., to proceed with maximum combinations of reactor temperature and ICA) while avoiding the conditions in the reactor (or combinations of conditions) that would lead to excessive stickiness and discontinuity events. These embodiments use only readily available process and resin property data, and can be readily implemented at plant sites either on-line through process control systems (i.e., by processing the relevant data in a processor that has been programmed to implement the inventive method and calculations or may be implemented off-line using available spreadsheets.

Several variations (or improvements) of the described examples of the inventive method are contemplated:

other solubility correlations for condensing and comonomers can be employed;

other methods to predict (possibly more accurately) mutual solubilities in multi-component systems can be employed;

improved enthalpy of fusion values (ΔHu) can be employed to account for variation of ΔHu with polymer density. (It has been reported in the literature that ΔHu is a function of the polymer density); and dilatometry data can be used to predict (possibly more accurately) the polymer and diluent volume fractions.

The inventors have appreciated the importance of isomeric compounds (isomers of comonomers) present in fluid bed polymerization reactors, in monitoring and optionally also controlling polymerization reactions occurring in the reactors (e.g., polyethylene polymerization reactions under metallocene catalyst polymerization conditions). Such isomeric compounds are relatively inert and accumulate significantly in commercial reactors fitted with recovery systems. (Isomers of the comonomer are rarely observed in any substantial amount in pilot plants which do not operate with recovery systems.) Because these isomers can be present in substantial amounts in commercial reaction systems, they can have a substantial impact of the melting point depression D and the reduced melt initiation temperature $MIT_R$. Preferred embodiments of the invention recognize and account for the impact of accumulated isomers on the melting point depression D, and the resulting values of $MIT_R$ and ΔMIT. Procedures to remedy the effects of accumulated isomers (such as controlled venting of the reactor as described below) are preferably also implemented.

The inventors have considered gas chromatograph composition data for isomers in at least one commercial, gas phase, polyethylene polymerization reactor operating with a catalyst substantially equivalent to Catalyst A. The data was analyzed to characterize separately the 1-hexene comonomer and the C6 and C6+ isomers of the comonomer in samples of cycle gas from the reactor. The data indicated that isomer concentrations as high as 2.5 mole percent (of the total reactor gas) were obtained in the reactor system, which was substantially higher than the approximately 1 to 1.5 mole percent concentration of 1-hexene alone. Further, at these levels, the isomers themselves (excluding the comonomer) produced an increased depression of the MIT equal to 4° C., which represents a very significant impact on commercial operations, including the tendency for sheeting. The inventors expect that an isomer concentrations greater than 2.5 mole percent would have a correspondingly greater impact on estimated degree of MIT depression and thus on likelihood of sheeting, if isomer accumulation were allowed to continue until such concentrations were reached.

It is contemplated that the dry melt initiation temperature (of a dry version of polymer resin being produced by polymerization) employed in various embodiments of the invention can be determined or defined in any of a number of different ways. For example, in some embodiments it is a peak polymer melt temperature determined from a first or second melt DSC measurement. In other embodiments, it is a polymer Seal Initiation Temperature measured on a resin film sample (for example, a heat seal initiation temperature as described in above-referenced PCT Application Publication Number WO 2005/113615), a resin Hot Tack Initiation Temperature (for example, a hot tack initiation temperature as described in above-referenced PCT Application Publication Number WO 2005/113615), a dry sticking temperature of granular polymer in a fluid bed, a Melt Initiation Temperature (MIT) determined graphically as the onset of rapid melting in a first or second melt DSC curve, or a dry sticking temperature at which agglomeration or fouling on any surface of the reactor vessel begins to occur with the reactor operating at normal pressure and gas velocity but in the presence of substantially pure nitrogen rather than the gas components actually present in the reactor during the reaction, or the temperature at which there is at least a 50% drop in bandwidth of a bed DP reading, whichever is less, where "bed DP reading" denotes measured pressure difference between the bottom and top of the fluid bed. Whatever method is employed to determine a melt initiation temperature, a consistent method is recommended to be used throughout the calculations, and appropriate limits for $\Delta$MIT (limits that apply for the particular melt initiation temperature that is employed) established, preferably through actual operating experience. In practice, limiting values of $\Delta$MIT are typically those values that correlate with an increased tendency for sheeting, chunking, and/or distributor plate fouling.

Specific methods and systems for inferring polymer stickiness by calculating the melting curve depression have been described herein. However, it is also contemplated that the melting curve depression D can be can be determined or estimated in any of a number of different ways; for example, in ways that do not make use of the Flory equation, or that use correlations for the solubility of diluent gas components in the resin other than those presented in the examples. The inventors contemplate that other such methods may be constructively employed. For example, a method including reasonable, engineering estimates of the diluent gas solubilities and the resulting depression of the polymer melting curve, may be employed. In preferred embodiments of the invention, all condensable components that are present in significant amounts in the cycle gas stream (including comonomer isomers) are measured and the step of determining an estimated degree of MIT depression accounts for such significant condensable components. The significant components should include isomer(s) of each comonomer present (e.g., each comonomer that is a C6 isomer, or each comonomer that is a C3-C10 alpha olefin). It is expected that some embodiments of the invention will use a lumped isomer concentration value for determining an estimated degree of MIT depression that accounts for the contributions of all isomers present in significant concentrations. Accurate accounting for isomers in determination of estimated degree of MIT depression is expected to provide direct benefits in many if not all embodiments of the invention, including those which generate reduced melt initiation temperature values (or $\Delta$MIT values) based on bed-averaged parameters of steady-state reactions and use them to characterize and control the steady-state reactions, and those which generate reduced melt initiation temperature values (or $\Delta$MIT values) based on instantaneous reaction parameters and use them to characterize and control the reactions during reaction transitions.

A specific control action to remedy the impact of isomers (of comonomers) on $\Delta$MIT is to vent isomers from the reactor/recycle system. Vented isomers may go to flare or to a recovery system separate from the reactor/recycle system of the reactor. As is well known to those skilled in the art, direct venting of the cycle gas to flare is possible, but is likely to be far from optimal. A preferred point for extracting a vent is from the gas stream exiting the resin purging system. A gas vent from this location contains a relatively high concentration of isomers (up to 50 percent by weight), and a relatively low concentration of ethylene. Depending on specific designs, other reactor systems with other configurations of product discharge, purging and recovery systems may have different preferred vent points.

We next describe examples of commercial-scale reactions (e.g., commercial-scale, gas-phase fluidized-bed polymerization reactions) that can be monitored and optionally also controlled in accordance with the invention. Some such reactions can occur in a reactor having the geometry of Reactor 10 of FIG. 1. In different embodiments of the invention, performance of any of a variety of different reactors is monitored and optionally also controlled in accordance with the invention.

In some embodiments, a continuous gas phase fluidized bed reactor is monitored and optionally also controlled in accordance with the invention while it operates to perform polymerization as follows: The fluidized bed is made up of polymer granules. Gaseous feed streams of the primary monomer and hydrogen together with liquid or gaseous comonomer are mixed together in a mixing tee arrangement and introduced below the reactor bed into the recycle gas line. For example, the primary monomer is ethylene and the comonomer is 1-hexene. The individual flow rates of ethylene, hydrogen and comonomer are controlled to maintain fixed gas composition targets. The ethylene concentration is controlled to maintain a constant ethylene partial pressure. The hydrogen is controlled to maintain a constant hydrogen to ethylene mole ratio. The hexene is controlled to maintain a constant hexene to ethylene mole ratio (or alternatively, the flow rates of comonomer and ethylene are held at a fixed ratio). The concentration of all gases is measured by an on-line gas chromatograph to ensure relatively constant composition in the recycle gas stream. A solid or liquid catalyst is injected directly into the fluidized bed using purified nitrogen as a carrier. The feed rate of catalyst is adjusted to maintain a constant production rate. The reacting bed of growing polymer particles is maintained in a fluidized state by the continuous flow of make up feed and recycle gas through the reaction zone (i.e. the fluidized bed). In some implementations, a superficial gas velocity of 1 to 3 ft/sec is used to achieve this, and the reactor is operated at a total pressure of 300 psig. To maintain a constant reactor temperature, the temperature of the recycle gas is continuously adjusted up or down to accommodate any changes in the rate of heat generation due to the polymerization. The fluidized bed is maintained at a constant height by withdrawing a portion of the bed at a rate equal to the rate of formation of particulate product. The product is removed semi-continuously via a series of valves into a fixed volume chamber, which is simultaneously vented back to the reactor. This allows for highly efficient removal of the product, while at the same time recycling a large portion of the unreacted gases back to the reactor. This product is purged to remove entrained hydrocarbons and treated with a small steam of humidified nitrogen to deactivate any trace quantities of residual catalyst.

In other embodiments, a reactor is monitored and optionally also controlled in accordance with the invention while it operates to perform polymerization using any of a variety of different processes (e.g., slurry, or gas phase processes). For example, the reactor can be a fluidized bed reactor operating to produce polyolefin polymers by a gas phase polymerization process. This type of reactor and means for operating such a reactor are well known. In operation of such reactors to perform gas phase polymerization processes, the polymerization medium can be mechanically agitated or fluidized by the continuous flow of the gaseous monomer and diluent.

In some embodiments, a polymerization reaction that is a continuous gas phase process (e.g., a fluid bed process) is monitored and optionally also controlled in accordance with the invention. A fluidized bed reactor for performing such a process typically comprises a reaction zone and a so-called velocity reduction zone. The reaction zone comprises a bed of growing polymer particles, formed polymer particles and a minor amount of catalyst particles fluidized by the continuous flow of the gaseous monomer and diluent to remove heat of polymerization through the reaction zone. Optionally, some of the re-circulated gases may be cooled and compressed to form liquids that increase the heat removal capacity of the circulating gas stream when readmitted to the reaction zone. This method of operation is referred to as "condensed mode". A suitable rate of gas flow may be readily determined by simple experiment. Make up of gaseous monomer to the circulating gas stream is at a rate equal to the rate at which particulate polymer product and monomer associated therewith is withdrawn from the reactor and the composition of the gas passing through the reactor is adjusted to maintain an essentially steady state gaseous composition within the reaction zone. The gas leaving the reaction zone is passed to the velocity reduction zone where entrained particles are removed. Finer entrained particles and dust may be removed in a cyclone and/or fine filter. The gas is compressed in a compressor and passed through a heat exchanger wherein the heat of polymerization is removed, and then returned to the reaction zone.

The reactor temperature (Trx) of the fluid bed process is normally operated at the highest temperature that is feasible, given the stickiness or sintering characteristics of the polymer in the fluid bed. Although there is no generally recognized method for establishing the upper limit of reactor temperature, the upper limit is believed to be related to the sintering temperature of the polymer product. The present method provides a quantitative means for setting the temperature limits based on the $MIT_R$ (the temperature at which the onset of melting is expected to occur in the reactor). The upper limit of reactor temperature is preferably set by the limiting value of $\Delta MIT$, defined above. The limiting value of $\Delta MIT$, as defined herein, is the maximum amount by which the reactor temperature can exceed the $MIT_R$ without inducing excessive stickiness in the product.

In other embodiments, a reactor whose operation is monitored and optionally also controlled in accordance with the invention effects polymerization by a slurry polymerization process. A slurry polymerization process generally uses pressures in the range of from 1 to 50 atmospheres, and temperatures in the range of 0° C. to 120° C., and more particularly from 30° C. to 100° C. In a slurry polymerization, a suspension of solid, particulate polymer is formed in a liquid polymerization diluent medium to which monomer and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, a branched alkane in one embodiment. The medium employed should be liquid under the conditions of polymerization and relatively inert. When a propane medium is used the process must be operated above the reaction diluent critical temperature and pressure. In one embodiment, a hexane, isopentane or isobutane medium is employed.

In other embodiments, a reaction monitored and optionally also controlled in accordance with the invention is or includes particle form polymerization, or a slurry process in which the temperature is kept below the temperature at which the polymer goes into solution. In other embodiments, a reaction monitored and optionally also controlled in accordance with the invention is a loop reactor or one of a plurality of stirred reactors in series, parallel, or combinations thereof. Non-limiting examples of slurry processes include continuous loop or stirred tank processes.

A reaction monitored and optionally also controlled in accordance with some embodiments of the invention can produce homopolymers of olefins (e.g., homopolymers of ethylene), and/or copolymers, terpolymers, and the like, of olefins, particularly ethylene, and at least one other olefin. The olefins, for example, may contain from 2 to 16 carbon atoms in one embodiment; and in another embodiment, ethylene and a comonomer comprising from 3 to 12 carbon atoms in another embodiment; and ethylene and a comonomer comprising from 4 to 10 carbon atoms in yet another embodiment; and ethylene and a comonomer comprising from 4 to 8 carbon atoms in yet another embodiment. A reaction monitored and optionally also controlled in accordance with the invention can produce polyethylenes. Such polyethylenes can be homopolymers of ethylene and interpolymers of ethylene and at least one α-olefin wherein the ethylene content is at least about 50% by weight of the total monomers involved. Exemplary olefins that may be utilized in embodiments of the invention are ethylene, propylene, 1-butene, 1-pentene, 1-hexene, 1-heptene, 1-octene, 4-methylpent-1-ene, 1-decene, 1-dodecene, 1-hexadecene and the like. Also utilizable herein are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene, and olefins formed in situ in the polymerization medium. When olefins are formed in situ in the polymerization medium, the formation of polyolefins containing long chain branching may occur.

In the production of polyethylene or polypropylene, comonomers may be present in the polymerization reactor. When present, the comonomer may be present at any level with the ethylene or propylene monomer that will achieve the desired weight percent incorporation of the comonomer into the finished resin. In one embodiment of polyethylene production, the comonomer is present with ethylene in a mole ratio range in the gas phase of from 0.0001 (comonomer: ethylene) to 50, and from 0.0001 to 5 in another embodiment, and from 0.0005 to 1.0 in yet another embodiment, and from 0.001 to 0.5 in yet another embodiment. Expressed in absolute terms, in making polyethylene, the amount of ethylene present in the polymerization reactor may range to up to 1000 atmospheres pressure in one embodiment, and up to 500 atmospheres pressure in another embodiment, and up to 100 atmospheres pressure in yet another embodiment, and up to 50 atmospheres in yet another embodiment, and up to 10 atmospheres in yet another embodiment.

Hydrogen gas is often used in olefin polymerization to control the final properties of the polyolefin. For some types of catalyst systems, it is known that increasing concentrations (or partial pressures) of hydrogen may alter the molecular weight or melt index (MI) of the polyolefin generated. The MI can thus be influenced by the hydrogen concentration. The amount of hydrogen in the polymerization can be expressed as a mole ratio relative to the total polymerizable monomer, for example, ethylene, or a blend of ethylene and hexene or propylene. The amount of hydrogen used in some polymerization processes is an amount necessary to achieve the desired MI (or molecular weight) of the final polyolefin resin. In one embodiment, the mole ratio in the gas phase of hydrogen to total monomer ($H_2$:monomer) is greater than 0.00001. The mole ratio is greater than 0.0005 in another embodiment, greater than 0.001 in yet another embodiment, less than 10 in yet another embodiment, less than 5 in yet another embodiment, less than 3 in yet another embodiment, and less than 0.10 in yet another embodiment, wherein a desirable range may comprise any combination of any upper mole ratio limit with any lower mole ratio limit described herein. Expressed another way, the amount of hydrogen in the reactor at any time may range to up to 10 ppm in one embodiment, or up to 100 or 3000 or 4000 or 5000 ppm in other embodiments, or between 10 ppm and 5000 ppm in yet another embodiment, or between 500 ppm and 2000 ppm in another embodiment.

A reactor monitored and optionally also controlled in accordance with some embodiments of the invention can be an element of a staged reactor employing two or more reactors in series, wherein one reactor may produce, for example, a high molecular weight component and another reactor may produce a low molecular weight component.

A reactor monitored and optionally also controlled in accordance with the invention can implement a slurry or gas phase process in the presence of a bulky ligand metallocene-type catalyst system and in the absence of, or essentially free of, any scavengers, such as triethylaluminum, trimethylaluminum, tri-isobutylaluminum and tri-n-hexylaluminum and diethyl aluminum chloride, dibutyl zinc and the like. By "essentially free", it is meant that these compounds are not deliberately added to the reactor or any reactor components, and if present, are present to less than 1 ppm in the reactor.

A reactor monitored and optionally also controlled in accordance with the invention can employ one or more catalysts combined with up to 10 wt % of a metal-fatty acid compound, such as, for example, an aluminum stearate, based upon the weight of the catalyst system (or its components). Other metals that may be suitable include other Group 2 and Group 5-13 metals. In other embodiments, a solution of the metal-fatty acid compound is fed into the reactor. In other embodiments, the metal-fatty acid compound is mixed with the catalyst and fed into the reactor separately. These agents may be mixed with the catalyst or may be fed into the reactor in a solution, a slurry, or as a solid (preferably as a powder) with or without the catalyst system or its components.

In a reactor monitored and optionally also controlled in accordance with some embodiments of the invention, supported catalyst(s) can be combined with activators and can be combined by tumbling and/or other suitable means, with up to 2.5 wt % (by weight of the catalyst composition) of an antistatic agent, such as an ethoxylated or methoxylated amine, an example of which is Kemamine AS-990 (ICI Specialties, Bloomington Del.). Other antistatic compositions include the Octastat family of compounds, more specifically Octastat 2000, 3000, and 5000.

Metal fatty acids and antistatic agents can be added as either solid slurries, solutions, or solids (preferably as a powder) as separate feeds into the reactor. One advantage of this method of addition is that it permits on-line adjustment of the level of the additive.

Examples of polymers that can be produced in accordance with the invention include the following: homopolymers and copolymers of C2-C18 alpha olefins; polyvinyl chlorides, ethylene propylene rubbers (EPRs); ethylene-propylene diene rubbers (EPDMs); polyisoprene; polystyrene; polybutadiene; polymers of butadiene copolymerized with styrene; polymers of butadiene copolymerized with isoprene; polymers of butadiene with acrylonitrile; polymers of isobutylene copolymerized with isoprene; ethylene butene rubbers and ethylene butene diene rubbers; and polychloroprene; norbornene homopolymers and copolymers with one or more C2-C18 alpha olefin; terpolymers of one or more C2-C18 alpha olefins with a diene.

Monomers that can be present in a reactor monitored and optionally also controlled in accordance with the invention include one or more of: C2-C18 alpha olefins such as ethylene, propylene, and optionally at least one diene, for example, hexadiene, dicyclopentadiene, octadiene including methyloctadiene (e.g., 1-methyl-1,6-octadiene and 7-methyl-1,6-octadiene), norbornadiene, and ethylidene norbornene; and readily condensable monomers, for example, isoprene, styrene, butadiene, isobutylene, chloroprene, acrylonitrile, cyclic olefins such as norbornenes.

Fluidized bed polymerization can be monitored and optionally also controlled in accordance with some embodiments of the invention. The reaction can be any type of fluidized polymerization reaction and can be carried out in a single reactor or multiple reactors such as two or more reactors in series.

In various embodiments, any of many different types of polymerization catalysts can be used in a polymerization process monitored and optionally also controlled in accordance with the present invention. A single catalyst may be used, or a mixture of catalysts may be employed, if desired. The catalyst can be soluble or insoluble, supported or unsupported. It may be a prepolymer, spray dried with or without a filler, a liquid, or a solution, slurry/suspension or dispersion. These catalysts are used with cocatalysts and promoters well known in the art. Typically these are alkylaluminums, alkylaluminum halides, alkylaluminum hydrides, as well as aluminoxanes. For illustrative purposes only, examples of suitable catalysts include Ziegler-Natta catalysts, Chromium based catalysts, Vanadium based catalysts (e.g., vanadium oxychloride and vanadium acetylacetonate), Metallocene catalysts and other single-site or single-site-like catalysts, Cationic forms of metal halides (e.g., aluminum trihalides), anionic initiators (e.g., butyl lithiums), Cobalt catalysts and mixtures thereof, Nickel catalysts and mixtures thereof, rare earth metal catalysts (i.e., those containing a metal having an atomic number in the Periodic Table of 57 to 103), such as compounds of cerium, lanthanum, praseodymium, gadolinium and neodymium.

In various embodiments, a polymerization reaction monitored and optionally also controlled in accordance with the invention can employ other additives, such as (for example) inert particulate particles.

It should be understood that while some embodiments of the present invention are illustrated and described herein, the invention is not to be limited to the specific embodiments described and shown.

The phrases, unless otherwise specified, "consists essentially of" and "consisting essentially of" do not exclude the presence of other steps, elements, or materials, whether or not, specifically mentioned in this specification, as along as such steps, elements, or materials, do not affect the basic and novel characteristics of the invention, additionally, they do not exclude impurities normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

What is claimed is:

1. A method, the method including the steps of:
   (a) during a polymerization reaction in a fluid bed reactor which produces a polymer resin, measuring parameters of the reaction including at least reactor temperature, at least one resin property of the polymer resin, and concentration of at least one condensable diluent gas in the reactor;
   (b) determining from the at least one resin property, using a predetermined correlation between resin melting temperature and said at least one resin property, a dry melt initiation temperature of a dry version of the polymer resin; and
   (c) during the reaction, using a melt initiation temperature depression model to determine, in on-line fashion from at least one of the parameters measured in step (a) and the dry melt initiation temperature value, a reduced melt initiation temperature for the polymer resin in the presence of the at least one condensable diluent gas, said melt initiation temperature depression model identifying an estimated degree of depression of the dry melt initiation temperature due to the presence of the diluent with the polymer resin.

2. The method of claim 1, wherein the melt initiation temperature depression model implements a Flory equation.

3. The method of claim 1, wherein the predetermined correlation is at least partially determined by differential scanning calorimetry measurements on a set of dry samples of polymer resin.

4. The method of claim 1, wherein step (a) includes the steps of measuring density and melt index of the polymer resin, a concentration of at least one induced condensing agent, a concentration of at least one comonomer, and a concentration of at least one isomer of the comonomer in the reactor.

5. The method of claim 1, wherein the dry melt initiation temperature is a temperature at which the dry version of the polymer resin is expected to begin to melt.

6. The method of claim 1, wherein step (b) includes the step of accessing at least one look-up table prepared in accordance with the predetermined correlation.

7. The method of claim 1, wherein step (c) includes the step of accessing at least one look-up table prepared in accordance with the melt initiation temperature depression model.

8. The method of claim 1, wherein step (c) includes the step of processing said at least one of the parameters measured in step (a) and the dry melt initiation temperature value in a processor programmed to implement the melt initiation temperature depression model.

9. The method of claim 1, wherein the reduced melt initiation temperature is a temperature at which the polymer resin is expected to begin to melt in the presence of the at least one condensable diluent gas in the reactor.

10. The method of claim 1, wherein steps (a)-(c) are performed repeatedly during the reaction to generate a sequence of reduced melt initiation temperature values, and also including the step of:
    using reduced melt initiation temperature values in the sequence to control the reaction.

11. The method of claim 1, also including the step of:
    (d) determining in on-line fashion a temperature value indicative of resin stickiness in the reactor, from the reduced melt initiation temperature determined in step (c) and a current value of the reactor temperature.

12. The method of claim 11, wherein the temperature value generated in step (d) is a temperature value $\Delta MIT$ that is at least substantially equal to $Trx-MIT_R$, where Trx is the current value of reactor temperature, and $MIT_R$ is the reduced melt initiation temperature determined in step (c).

13. The method of claim 11, wherein steps (a)-(d) are performed repeatedly during the reaction to generate a sequence of temperature values indicative of resin stickiness in the reactor, said method also including the step of:
    (e) controlling the reaction in response to at least some of the temperature values indicative of resin stickiness in the reactor.

14. The method of claim 13, wherein the reaction is a polyethylene polymerization reaction, the temperature value generated in each repetition of step (d) is a temperature value, $\Delta MIT$, that is at least substantially equal to $Trx-MIT_R$, where Trx is a current value of reactor temperature and $MIT_R$ is the reduced melt initiation temperature determined in step (c), and step (e) controls the reaction in an effort to maintain a current value of $\Delta MIT$ in a predetermined temperature range.

15. The method of claim 11, also including the step of:
    (e) controlling the reaction in response to the temperature value generated in step (d).

16. The method of claim 15, wherein step (e) includes the step of controlling the reaction in an effort to prevent occurrence of excessive resin stickiness in the reactor.

17. The method of claim 15, wherein step (e) includes the step of controlling the reaction in an effort to maximize reactor production rate while preventing occurrence of excessive resin stickiness in the reactor.

18. The method of claim 1, wherein step (a) includes the step of measuring concentrations of least one induced condensing agent, at least one comonomer, and at least one isomer of the comonomer.

19. The method of claim 18, wherein the reaction polymerizes ethylene and said at least one comonomer in the presence of a catalyst selected from a group consisting of Ziegler-Natta, chromium, chromium oxide, $AlCl_3$, cobalt, iron, palladium, and metallocene catalyst.

20. The method of claim 19, wherein the polymer resin is polyethylene and each said comonomer is a $C_3$-$C_{10}$ alpha olefin.

21. The method of claim 1, wherein the polymer resin is a polyolefin.

22. The method of claim 1, wherein the polymer resin is polyethylene.

23. The method of claim 1, wherein step (a) includes the step of measuring at least one bed-averaged property of the polymer resin during the polymerization reaction.

24. The method of claim 1, wherein step (a) includes the step of measuring at least one instantaneous property at least one of the parameters of the polymerization reaction during said polymerization reaction.

25. The method of claim 24, wherein step (a) includes the step of measuring at least instantaneous reactor temperature and instantaneous concentration of at least one condensable diluent gas in the reactor during said polymerization reaction.

26. A method, the method including the steps of:
(a) during a polymerization reaction in a fluid bed reactor which produces a polymer resin, measuring instantaneous and bed-averaged parameters of the reaction including at least one instantaneous property of the polymer resin and at least one bed-averaged property of the polymer resin;
(b) determining a first dry melt initiation temperature of a dry version of the polymer resin from the at least one instantaneous property of the polymer resin and determining a second dry melt initiation temperature of the dry version of the polymer resin from the at least one bed-averaged property of the polymer resin;
(c) during the reaction, using a melt initiation temperature depression model to determine, in on-line fashion from at least some of the parameters measured in step (a), the first dry melt initiation temperature value, and the second dry melt initiation temperature value, a first reduced melt initiation temperature and a second reduced melt initiation temperature value for the polymer resin in the presence of at least one condensable diluent gas; and
(d) determining, in on-line fashion, a first temperature value indicative of resin stickiness in the reactor from the first reduced melt initiation temperature and a current value of the reactor temperature, and a second temperature value indicative of resin stickiness in the reactor from the second reduced melt initiation temperature and the current value of the reactor temperature.

27. The method of claim 26, also including the step of:
(e) controlling the reaction in response to at least one of the first temperature value and the second temperature value generated in step (d).

28. The method of claim 27, wherein step (e) includes the steps of controlling the reaction in response to the second temperature value during a transition in the reaction, and controlling the reaction in response to the first temperature value when said reaction is not undergoing a transition.

29. The method of claim 27, wherein step (e) includes the step of controlling the reaction in an effort to maintain the first temperature value below a first predetermined limit and to maintain the second temperature value below a second predetermined limit.

30. The method of claim 27, wherein step (e) includes the step of controlling the reaction in an effort to maintain the first temperature value within a first predetermined range and to maintain the second temperature value within a second predetermined range.

31. The method of claim 26, wherein step (a) includes the step of measuring concentration of at least one induced condensing agent, at least one comonomer, and at least one isomer of the comonomer.

32. The method of claim 31, wherein the reaction polymerizes ethylene and said at least one comonomer in the presence of a catalyst selected from a group consisting of Ziegler-Natta, chromium, chromium oxide, $AlCl_3$, cobalt, iron, palladium, and metallocene catalyst.

33. The method of claim 32, wherein the polymer resin is polyethylene and each said comonomer is a $C_3$-$C_{10}$ alpha olefin.

34. The method of claim 26, wherein the polymer resin is a polyolefin.

35. The method of claim 26, wherein the melt initiation temperature depression model implements the Flory equation.

36. The method of claim 26, wherein the predetermined correlation is at least partially determined by differential scanning calorimetry measurements on a set of dry samples of polymer resin.

37. A method, the method including the steps of:
(a) during a polymerization reaction in a fluid bed reactor which produces a polymer resin, measuring parameters of the reaction including at least reactor temperature, at least one resin property of the polymer resin, and concentration of at least one condensable diluent gas in the reactor;
(b) determining from the at least one resin property, using a predetermined correlation between resin melting temperature and said at least one resin property, a dry melt initiation temperature of a dry version of the polymer resin; and
(c) during the reaction, using a melt initiation temperature depression model to determine from at least some of the parameters measured in step (a) and the dry melt initiation temperature value, a reduced melt initiation temperature for the polymer resin in the presence of the at least one condensable diluent gas, said melt initiation temperature depression model identifying an estimated degree of depression of the dry melt initiation temperature due to the presence of the diluent with the polymer resin.

38. The method of claim 37, wherein the melt initiation temperature depression model implements a Flory equation.

39. The method of claim 37, wherein the predetermined correlation is at least partially determined by differential scanning calorimetry measurements on a set of dry samples of polymer resin.

40. The method of claim 37, wherein step (a) includes the steps of measuring density and melt index of the polymer resin, a concentration of at least one induced condensing agent, a concentration of at least one comonomer, and a concentration of at least one isomer of the comonomer in the reactor.

41. The method of claim 37, wherein the dry melt initiation temperature is a temperature at which the dry version of the polymer resin is expected to begin to melt.

42. The method of claim 37, wherein step (b) includes the step of accessing at least one look-up table prepared in accordance with the predetermined correlation.

43. The method of claim 37, wherein step (c) includes the step of accessing at least one look-up table prepared in accordance with the melt initiation temperature depression model.

44. The method of claim 37, wherein step (c) includes the step of processing said at least some of the parameters measured in step (a) and the dry melt initiation temperature value in a processor programmed to implement the melt initiation temperature depression model.

45. The method of claim 37, wherein the reduced melt initiation temperature is a temperature at which the polymer resin is expected to begin to melt in the presence of the at least one condensable diluent gas in the reactor.

46. The method of claim 37, wherein steps (a)-(c) are performed repeatedly during the reaction to generate a sequence of reduced melt initiation temperature values, and also including the step of:

using reduced melt initiation temperature values in the sequence to control the reaction.

47. The method of claim 37, wherein the reduced melt initiation temperature is a temperature above which the polymer resin in the reactor is predicted to become sticky in the presence of the at least one condensable diluent gas.

48. The method of claim 37, also including the step of:

(d) determining a temperature value indicative of resin stickiness in the reactor, from the reduced melt initiation temperature determined in step (c) and a current value of the reactor temperature.

49. The method of claim 48, wherein the temperature value generated in step (d) is a temperature value $\Delta MIT$ that is at least substantially equal to $Trx-MIT_r$, where Trx is the current value of reactor temperature, and $MIT_r$ is the reduced melt initiation temperature determined in step (c).

50. The method of claim 48, wherein steps (a)-(d) are performed repeatedly during the reaction to generate a sequence of temperature values indicative of resin stickiness in the reactor, said method also including the step of:

(e) controlling the reaction in response to at least some of the temperature values indicative of resin stickiness in the reactor.

51. The method of claim 50, wherein the reaction is a polyethylene polymerization reaction, the temperature value generated in each repetition of step (d) is a temperature value, $\Delta MIT$, that is at least substantially equal to $Trx-MIT_r$, where Trx is a current value of reactor temperature and $MIT_r$ is the reduced melt initiation temperature determined in step (c), and step (e) controls the reaction in an effort to maintain a current value of $\Delta MIT$ in a predetermined temperature range.

52. The method of claim 48, also including the step of:

(e) controlling the reaction in response to the temperature value generated in step (d).

53. The method of claim 52, wherein step (e) includes the step of controlling the reaction in an effort to prevent occurrence of excessive resin stickiness in the reactor.

54. The method of claim 53, wherein step (e) includes the step of controlling the reaction in an effort to maximize reactor production rate while preventing occurrence of excessive resin stickiness in the reactor.

55. The method of claim 37, wherein step (a) includes the step of measuring concentrations of least one induced condensing agent at least one comonomer, and at least one isomer of the comonomer.

56. The method of claim 55, wherein the reaction polymerizes ethylene and said at least one comonomer in the presence of a catalyst selected from a group consisting of Ziegler-Natta, chromium, chromium oxide, $AlCl_3$, cobalt, iron, palladium, and metallocene catalyst.

57. The method of claim 56, wherein the polymer resin is polyethylene and each said comonomer is a $C_3$-$C_{10}$ alpha olefin.

58. The method of claim 37, wherein the polymer resin is a polyolefin.

59. The method of claim 37, wherein the polymer resin is polyethylene.

* * * * *